US011295176B2

(12) United States Patent
Heide

(10) Patent No.: US 11,295,176 B2
(45) Date of Patent: *Apr. 5, 2022

(54) SYSTEM AND METHOD FOR JOINT IMAGE REFINEMENT AND PERCEPTION

(71) Applicant: ALGOLUX INC., Montreal (CA)

(72) Inventor: Felix Heide, Palo Alto, CA (US)

(73) Assignee: ALGOLUX INC., Montreal (CA)

( * ) Notice: Subject to any disclaimer, the term of this patent is extended or adjusted under 35 U.S.C. 154(b) by 10 days.

This patent is subject to a terminal disclaimer.

(21) Appl. No.: 16/927,741

(22) Filed: Jul. 13, 2020

(65) Prior Publication Data
US 2020/0364515 A1 Nov. 19, 2020

Related U.S. Application Data

(63) Continuation of application No. 16/025,776, filed on Jul. 2, 2018, now Pat. No. 10,713,537.
(Continued)

(51) Int. Cl.
*G06K 9/62* (2006.01)
*G06T 5/00* (2006.01)
(Continued)

(52) U.S. Cl.
CPC ......... *G06K 9/6268* (2013.01); *G06K 9/4628* (2013.01); *G06K 9/6271* (2013.01);
(Continued)

(58) Field of Classification Search
CPC .................... G06N 20/20; G06N 3/082; G06T 2207/20084; G06T 2207/20081
See application file for complete search history.

(56) References Cited

U.S. PATENT DOCUMENTS 7,053,612 B2 * 5/2006 St. Pierre ........... G01R 33/5659
324/307
7,117,916 B2 10/2006 Johnston
(Continued)

OTHER PUBLICATIONS

Dong, et al., "Learning a Deep Convolutional Network for Image Super-Resolution", Proceedings of the European Conference on Computer Vision, 2014, pp. 184-199.
(Continued)

*Primary Examiner* — Yosef Kassa
(74) *Attorney, Agent, or Firm* — IP-Mex Inc.; Victoria Donnelly

(57) ABSTRACT

System and method for joint refinement and perception of images are provided. A learning machine employs an image acquisition device for acquiring a set of training raw images. A processor determines a representation of a raw image, initializes a set of image representation parameters, defines a set of analysis parameters of an image analysis network configured to process the image's representation, and jointly trains the set of representation parameters and the set of analysis parameters to optimize a combined objective function. A module for transforming pixel-values of the raw image to produce a transformed image comprising pixels of variance-stabilized values, a module for successively performing processes of soft camera projection and image projection, and a module for inverse transforming the transformed pixels are disclosed. The image projection performs multi-level spatial convolution, pooling, subsampling, and interpolation.

21 Claims, 21 Drawing Sheets

Related U.S. Application Data

(60) Provisional application No. 62/528,054, filed on Jul. 1, 2017.

(51) Int. Cl.
*G06T 5/50* (2006.01)
*G06N 20/00* (2019.01)
*G06K 9/46* (2006.01)
*G06N 3/04* (2006.01)
*G06N 3/08* (2006.01)

(52) U.S. Cl.
CPC ............ *G06N 3/0454* (2013.01); *G06N 3/084* (2013.01); *G06N 20/00* (2019.01); *G06T 5/001* (2013.01); *G06T 5/003* (2013.01); *G06T 5/50* (2013.01); *G06T 2207/20081* (2013.01); *G06T 2207/20084* (2013.01); *G06T 2207/20182* (2013.01)

(56) References Cited

U.S. PATENT DOCUMENTS

| | | | |
|---|---|---|---|
| 7,821,266 B2* | 10/2010 | Feiweier | G01R 33/54 324/309 |
| 8,295,565 B2 | 10/2012 | Gu | |
| 8,401,248 B1 | 3/2013 | Moon | |
| 8,462,996 B2 | 6/2013 | Moon | |
| 8,620,852 B1 | 12/2013 | Kipersztok et al. | |
| 8,675,105 B2 | 3/2014 | Lansel | |
| 8,676,731 B1* | 3/2014 | Sathyanarayana | G06K 9/00442 706/12 |
| 8,687,879 B2 | 4/2014 | Cotman | |
| 8,724,910 B1 | 5/2014 | Pillai | |
| 9,852,492 B2 | 12/2017 | Saberian et al. | |
| 9,928,418 B2 | 3/2018 | Segalovitz et al. | |
| 9,965,863 B2 | 5/2018 | Xu et al. | |
| 9,978,003 B2 | 5/2018 | Sachs et al. | |
| 9,984,325 B1* | 5/2018 | Kim | G06K 9/66 |
| 2017/0011710 A1 | 1/2017 | Pajak et al. | |

OTHER PUBLICATIONS

Makitalo, et al., "Optimal Inversion of the Generalized Anscombe Transformation for Poisson-Guassian Noise", IEEE Transactions on Image Processing, vol. 22, No. 1, Jan. 2013, pp. 91-103.
Foi, et al., "Practical Poissonian-Gaussian noise modeling and fitting for single-image raw-data", IEEE Trans. Image Process., 17, 10, (1737-1754), pp. 1-18.
Foi, "Clipped noisy images: Heteroskedastic modeling and practical denoising", Signal Processing 89, 12, 2009, pp. 2609-2629.
Geman, et al., "Nonlinear Image Recovery with Half-Quadratic Regularization", IEEE Trans. Image Processing 4, 7, 1993, pp. 932-946.
Gharbi, et al., "Deep Joint Demosaicking and Denoising", ACM Transactions on Graphics (TOG) vol. 35, No. 6, Article 191, Nov. 2016.
Pock, et al., "An Algorithm for Minimizing the Mumford-Shah Functional", IEEE International Conference on Computer Vision, Nov. 2009.
Heide, et al., "FlexISP: A Flexible Camera Image Processing Framework", ACM Trans. Graph., (SIGGRAPH Asia) 33, 6, 2014.
Heide, et al., "ProxImaL: Efficient Image Optimization using Proximal Algorithms", ACM Trans. Graph., vol. 35, No. 4, Article 84, Jul. 2016.
"Photography—Electronic still picture imaging—Resolution and spatial frequency responses", ISO 12233:2014.
Jain, et al., "Natural Image Denoising with Convolutional Networks", Advances in Neural Information Processing Systems, 2009, pp. 769-776.
Jalalvand, et al., "Towards Using Reservoir Computing Networks for Noise-Robust Image Recognition", Proceedings of the International Joint Conference on Neural Networks, 2016, pp. 1666-1672.
Jin, et al., "Deep Convolutional Neural Network for Inverse Problems in Imaging", arXiv:1611.03679v1 [cs.CV] Nov. 11, 2016, pp. 1-20.
Kim, et al., "Accurate Image Super-Resolution Using Very Deep Convolutional Networks", Proceedings of the IEEE Conference on Computer Vision and Pattern Recognition, 2016, pp. 1646-1654.
Martin, et al., "A Database of Human Segmented Natural Images and its Application to Evaluating Segmentation Algorithms and Measuring Ecological Statistics", Proc., 8th Int'l Conf. Computer Vision, vol. 2, Report No. UCB/CSD-1-1133, 2001, pp. 416-423.
Mosleh, et al., "Camera Intrinsic Blur Kernel Estimation: A Reliable Framework", IEEE Conference on Computer Vision and Pattern Recognition (CVPR), 2015, pp. 4961-4968.
Ochs, et al., "Bilevel Optimization with Nonsmooth Lower Level Problems", International Conference on Scale Space and Variational Methods in Computer Vision, Springer, 2015, pp. 654-665.
Ochs, et al., "Techniques for Gradient Based Bilevel Optimization with Nonsmooth Lower Level Problems", Journal of Mathematical Imaging and Vision, arXiv:1602.07080v2 [math.OC] Apr. 26, 2016, pp. 1-19.
Ronneberger, et al., "U-Net: Convolutional Networks for Biomedical Image Segmentation", Medical Image Computing and Computer-Assisted Intervention (MICCAI), Springer, LNCS, vol. 9351, 2015, pp. 234-241.
Ioffe, et al., "Batch Normaliztion: Accelerating Deep Network Training by Reducing Internal Covariate Shift", (Submitted on Feb. 11, 2015 (v1), last revised Mar. 2, 2015 (this version, v3), arXiv:1502.03167v3 [cs.LG].
Diamond et al., "Unrolled Optimization with Deep Priors", arXiv:1705.08041v1 [cs.CV] May 22, 2017.
Quan et al., "A New Poisson Noisy Image Denoising Method Based on the Anscombe Transformation", http://worldcomp-proceedings.com/proc/p2012/IPC7929.pdf.
Kingma, et al., "Adam: A Method for Stochastic Optimization", ICLR 2015, arXiv:1412.6980v9 [cs.LG] Jan. 30, 2017.
Tieleman, et al, 2012, Lecture 6.5-rmsprop: Divide the gradient by a running average of its recent magnitude. COURSERA: Neural Networks for Machine Learning 4, 2.
Glowinski, et al., 1975, Sur l'approximation, par elements finis d'ordre un, et la resolution, par penalisation-dualite d'une classe de problemes de dirichlet non lineaires. Revue francaise d'automatique, informatique, recherche operationnelle. Analyse numerique 9, 2, 41-76.
Abadi et al., "TensorFlow: Large-scale machine learning on heterogeneous systems", 2015, pp. 1-19.
Agostinelli, et al., "Adaptive Multi-Column Deep Neural Networks with Application to Robust Image Denoising", Advances in Neural Information Processing Systems, 1493-1501, 2013, pp. 1-9.
Ahmed, et al., "Discrete Cosine Transform", IEEE Transactions on Computers C-23, 1, 1974, pp. 90-93.
Beck, et al., "A Fast Iterative Shrinkage-Thresholding Algorithm for Linear Inverse Problems", SIAM Journal on Imaging Sciences 2, 1, 2009, pp. 183-202.
Boyd, et al., "Convex Optimization", Cambridge University Press, 2004.
Boyd, et al., "Distributed Optimization and Statistical Learning via the Alternating Direction Method of Multipliers", Foundations and Trends in Machine Learning, 3, 1, 2010, pp. 1-122.
Bruck, "An Iterative Solution of a Variational Inequality for Certain Monotone Operators in Hilbert Space", Bulletin of the American Mathematical Society, 81, 5, Sep. 1975, pp. 890-892.
Buades, et al., "A non-local algorithm for image denoising", Proc. IEEE CVPR, vol. 2, 2005, pp. 60-65.
Burger, et al., "Image denoising: Can plain Neural Networks compete with BM3D?", Proceedings of IEEE Conference on Computer Vision and Pattern Recognition, 2012, pp. 2392-2399.
Chakrabarti, "A Neural Approach to Blind Motion Deblurring", Proceedings of the European Conference on Computer Vision, 2016.

(56) References Cited

OTHER PUBLICATIONS

Chambolle, et al., "A first-order primal-dual algorithm for convex problems with applications to imaging", Journal of Mathematical Imaging and Vision 40, 1, 2010, pp. 120-145.
Chen, et al., "Trainable Nonlinear Reaction Diffusion: A Flexible Framework for Fast and Effective Image Restoration", IEEE Transactions on Pattern Analysis and Machine Intelligence, vol. XX, No. XX, 2016, arXiv:1508:.02848v2 [cs.CV] Aug. 20, 2016, pp. 1-15.
Chen, et al., "On learning optimized reaction diffusion processes for effective image restoration", Proceedings of the IEEE Conference on Computer Vision and Pattern Recognition, 2015, pp. 5261-5269.
Chen, et al., "Joint Visual Denoising and Classification Using Deep Learning", Proceedings of the IEEE International Conference on Image Processing, 2016, pp. 3673-3677.
Da Costa, et al., "An empirical study on the effects of different types of noise in image classification tasks", arXiv:1609.02781v1 [cs.CV] Sep. 9, 2016.
Danielyan, et al., "BM3D frames and variational image deblurring", IEEE Trans. Image Processing 21, 4, 2011, arXiv:1106.6180v1 [math.OC] Jun. 30, 2011, pp. 1715-1728.
Daubechies, "Ten Lectures of Wavelets", vol. 61, SIAM, 1992.
Deng, et al., "ImageNet: a Large-Scale Hierarchical Image Database", Conference Paper in Proceedings, CVPR, IEEE Computer Society Conference on Computer Vision and Pattern Recognition, Jun. 2009, pp. 248-255.
Dodge, et al., "Understanding How Image Quality Affects Deep Neural Networks", arXiv:1604.04004v2 [cs.CV] Apr. 21, 2016, pp. 1-6.
Ramanath, et al., "Color Image Processing Pipeline in Digital Still Cameras", IEEE Signal Processing Magazine 22, 1, 2005, pp. 34-43.
Roth, et al., "Field of Experts: A Framework for Learning Image Priors", IEEE Computer Society Conference on Computer Vision and Pattern Recognition (CVPR'05), vol. 2, 2005, pp. 860-867.
Rudin, et al., "Nonlinear total variation based noise removal algorithms", Physica D: Nonlinear Phenomena 60, 14, 1992, pp. 259-268.
Schmidt, et al., "Shrinkage Fields for Effective Image Restoration", Proceedings of the IEEE Conference on Computer Vision and Pattern Recognition, 2014, pp. 2774-2781.
Schuler, et al., "A machine learning approach for non-blind image deconvolution", Proceedings of the IEEE Conference on Computer Vision and Pattern Recognition, 2013, pp. 1067-1074.
Schuler, et al., "Learning to Deblur", NIPS 2014 Deep Learning and Representation Learning Workshop, arXiv:1406.7444v1 [cs.CV] Jun. 28, 2014, pp. 1-28.
Shao, et al., "From Heuristic Optimization to Dictionary Learning: A Review and Comprehensive Comparison of Image Denoising Algorithms", IEEE Transactions on Cybernetics, vol. 44, No. 7, Jul. 2014, pp. 1001-1013.
Szegedy, et al., "Inception-v4, Inception-ResNet and the Impact of Residual Connections on Learning", Proceedings of the Thirty-First AAAI Conference on Artificial Intelligence (AAAI-17), 2016, pp. 4278-4284.
Tang, et al., "Deep networks for robust visual recognition", Proceedings of the International Conference on Machine Learning, 2010, pp. 1055-1062.
Tang, et al., "Robust Boltzmann Machines for Recognition and Denoising", 2012 IEEE Conference on Computer Vision and Pattern Recognition (CVPR), pp. 2264-2271.
Vasiljevic, et al., "Examining the Impact of Blur on Recognition by Convolutional Networks", arXiv:1611.05760v2 [cs.CV] May 30, 2017, pp. 1-10.
Wang, et al., "Proximal Deep Structured Models", Advances in Neural Information Processing Systems 29, 2016, pp. 865-873.
Xie, et al., "Image Denoising and Inpainting with Deep Neural Networks", Proceedings of the International Conference on Neural Information Processing Systems, 2012, pp. 341-349.
Xu, et al., "Deep Convolutional Neural Network for Image Deconvolution", Advances in Neural Information Processing Systems, 2014, pp. 1790-1798.
Zhang, et al., "Color demosaicking by local directional interpolation and nonlocal adaptive thresholding", Journal of Electronic Imaging, 20(2), 023016, 2011.
Zhang, et al., "Learning Fully Convolutional Networks for Iterative Non-blind Deconvolution", arXiv preprint arXiv:1611.06495, 2016.
Zhang, et al., "Beyond a Gaussian Denoiser: Residual Learning of Deep CNN for Image Denoising", arXiv:1608.03981v1 [cs.CV] Aug. 13, 2016.
EMVA 1288 Standard for Characterization of Image Sensors and Cameras, Release 3.1, Dec. 30, 2016, Issued by European Machine Vision Association.
Glorot, et al., "Understanding the difficulty of training deep feedforward neural networks", Proceedings of the 13th International Conference on Artificial Intelligence and Statistics (AISTATS) 2010, vol. 9 of JLMR. W&CP 9, pp. 249-256.

\* cited by examiner

SYSTEM AND METHOD FOR JOINT IMAGE REFINEMENT AND PERCEPTION

CROSS-REFERENCE TO RELATED APPLICATIONS

The present application is a Continuation of U.S. patent application Ser. No. 16/025,776 filed Jul. 2, 2018, which is now a U.S. Pat. No. 10,713,537 issued on Jul. 14, 2020, which claims the benefit of U.S. provisional application 62/528,054 filed on Jul. 1, 2017;

the entire contents of the above noted US patent and US patent applications being incorporated herein by reference.

FIELD OF THE INVENTION

The present invention relates to image signal processing and image perception. In particular, the invention is directed towards methods of enhancing machine perception.

BACKGROUND

In an image formation process, image sensor measurements are subject to degradations. Raw sensor readings suffer from photon shot noise, optical aberration, read-out noise, spatial subsampling in the color filter array (CFA), spectral cross-talk on the CFA, motion blur, and other imperfections. An image signal processor (ISP), which may be a hardware entity, addresses such degradations by processing the raw measurement in a sequential pipeline of steps, each targeting a degradation type in isolation, before displaying or saving the resulting output image. The ISP performs an extensive set of operations, such as demosaicing, denoising, and deblurring. Current image processing algorithms are designed to minimize an explicit or implicit image reconstruction loss relevant to human perceptions of image quality.

Progress in imaging and graphics has enabled many applications, including autonomous driving, automated design tools, robotics, and surveillance, where images are consumed directly by a higher-level analysis module without ever being viewed by humans. This gives rise to the question of whether signal processing is necessary, i.e., whether a learning machine is better trained directly on raw sensor data. ISPs map data from diverse camera systems into relatively clean images. However, recovering a latent image is difficult in low-light captures that are heavily degraded by photon shot noise. Low light is, in effect, a failure mode for conventional computer vision systems, which combine existing ISPs with existing classification networks.

The performance of conventional imaging and perception networks degrades under noise, optical aberrations, and other imperfections present in raw sensor data. An image-processing pipeline may interpose an image source and an image renderer to reconstruct an image that has been deteriorated. An image pipeline may be implemented using a general-purpose computer, a Field-Programmable Gate Array (FPGA), or an Application-Specific Integrated Circuit (ASIC). Conventional image-processing pipelines (ISPs) are optimized for human viewing, not for machine vision.

A demosaicing process, which is also called color-filter-array interpolation (CFA interpolation), reconstructs a full color image from incomplete color samples output from an image sensor overlaid with a CFA.

An image denoising process estimates the original image by suppressing noise from a noise-contaminated image. Several algorithms for image denoising are known in the art.

An image deblurring process attempts to remove blurring artifacts from images, such as blur caused by defocus aberration or motion blur.

It is observed that conventional perception networks, which use state-of-the-art ISPs and classifiers trained on a standard JPEG dataset, perform poorly in low light.

There is a need, therefore, to explore improved perception networks that perform well under adverse illumination conditions.

TERMINOLOGY

Several terms used in the detailed description are commonly used in the art. See, for example, references shown below, all of which are incorporated herein by reference.

Felix Heide, Douglas Lanman, Dikpal Reddy, Jan Kautz, Kari Pulli, and David Luebke. 2014a. Cascaded Displays: Spatiotemporal Superresolution Using Offset Pixel Layers. *ACM Trans. Graph. (SIGGRAPH)* 33, 4 (2014).

F. Heide, M. Steinberger, Y.-T. Tsai, M. Rouf, D. Pajak, D. Reddy, O. Gallo, J. Liu, W. Heidrich, K. Egiazarian, J. Kautz, and K. Pulli. 2014b. FlexISP: A flexible camera image processing framework. *ACM Trans. Graph. (SIGGRAPH Asia)* 33, 6 (2014).

Olaf Ronneberger, Philipp Fischer, and Thomas Brox. 2015. U-Net: Convolutional Networks for Biomedical Image Segmentation. CoRR abs/1505.04597 (2015). arXiv: 1505.04597 http://arxiv.org/abs/1505.04597

A. Foi and M. Makitalo. 2013. Optimal inversion of the generalized Anscombe transformation for Poisson-Gaussian noise. *IEEE Trans. Image Process.* 22, 1 (2013), 91-103.

SUMMARY

The invention provides a novel apparatus, a learning-machine, configured for joint determination of optimal parameters of image denoising, demosaicing, and analysis. Configuration of the apparatus is based on formulating an end-to-end differentiable objective function. The apparatus accepts raw color filter array data and is flexible to handle different sensor configurations and capture settings without retraining or capturing of new training datasets.

Jointly tuning an image-reconstruction module and an image classification module outperforms training a classification module directly on raw images or the refined images produced using software and hardware Image Signal Processors (ISPs).

In accordance with an aspect, the invention provides a method of machine learning. The method is based on acquiring a plurality of raw images and employing at least one hardware processor to execute processes of determining a representation of a raw image of the plurality of raw images, initializing a plurality of representation parameters of the representation, defining a plurality of analysis parameters of an image analysis network configured to process the image representation, and jointly training the plurality of representation parameters and the plurality of analysis parameters to optimize a combined objective function.

The process of determining a representation of a raw image starts with transforming pixel-value of the raw image to produce a variance-stabilized transformed image. The transformed image is processed in a sequence of image representation stages, each stage comprising a soft camera projection module and an image projection module, resulting in a multi-channel representation. An inverse pixel-value transformation is applied to the multi-channel representation.

The combined objective function may be formulated as a nested bilevel objective function comprising an outer objective function relevant to the image analysis network and an inner objective function relevant to the representation.

The pixel-value transformation may be based on an Anscombe transformation in which case the inverse pixel-value transformation would be an unbiased inverse Anscombe transformation. The process of pixel-value transformation also generates an added channel.

The process of image projection comprises performing steps of multi-level spatial convolution, pooling, subsampling, and interpolation. The plurality of representation parameters comprises values of the number of levels, pooling, a stride of subsampling, and a step of interpolation.

The method further comprises evaluating the learned machine using a plurality of test images and revising the number of levels, pooling parameter, a stride of the subsampling, and a step of the interpolation according to a result of the evaluation.

The method further comprises evaluating the learned machine using a plurality of test images and adding selected test images to the plurality of raw images. The processes of determining, initializing, defining, and jointly training are then repeated, thus, enabling continually updating the plurality of representation parameters and the plurality of analysis parameters.

The method further comprises cyclically operating the learned machine in alternate modes. During a first mode the plurality of raw images are updated; and the processes of determining, initializing, defining, and jointly training are executed. During a second mode, new images are analysed according to latest values of the plurality of representation parameters and the plurality of analysis parameters.

In accordance with another aspect, the invention provides a learning machine. The learning machine employs an image acquisition device for acquiring a plurality of raw images and comprises a memory device, and a hardware processor. The memory device comprises a plurality of storage units, storing processor executable instructions. The hardware processor comprises a plurality of processing units.

The instructions cause the hardware processor to determine a representation of a raw image of the plurality of raw images, initialize a plurality of representation parameters defining the representation, define a plurality of analysis parameters of an image analysis network configured to process the representation, and jointly train the plurality of representation parameters and the plurality of analysis parameters to optimize a combined objective function.

The processor executable instructions comprise modules which cause the hardware processor to:
(1) transform pixel-values of the raw image to produce a transformed image comprising pixels of variance-stabilized values;
(2) successively perform processes of soft camera projection; and image projection; and
(3) perform inverse transformation.

The processor executable instructions further comprise a module causing the hardware processor to execute an algorithm for joint optimization of nested bilevel objective functions, thereby enabling formulation of the combined objective function as an outer objective function relevant to the image analysis network and an inner objective function relevant to the representation.

The processor executable instructions further comprise a module causing the processor to implement an Anscombe transformation and a module causing the processor to implement an unbiased inverse Anscombe transformation.

The processor executable instructions further comprise a module causing the hardware processor to generate an additional channel to the transformed image.

The processor executable instructions further comprise a module causing the hardware processor to perform processes of multi-level spatial convolution, pooling, subsampling, and interpolation.

The memory device stores specified values for the number of levels, pooling parameters, a stride of subsampling, and a step of interpolation.

The processor executable instructions comprise a module causing the hardware processor to perform processes of performance evaluation using a plurality of test images; and revising the number of levels, pooling parameters, a stride of subsampling, and a step of interpolation according to a result of evaluation.

The processor executable instructions further comprise a module causing the hardware processor to perform processes of performance evaluation using a plurality of test images, adding selected test images to the plurality of raw images, and repeating the processes of determining, initializing, defining, and jointly training.

The processor executable instructions further comprise a module causing the hardware processor to perform a cyclic bimodal operation. During a first mode the plurality of raw images is updated and the processes of determining, initializing, defining, and jointly training are executed.

During a second mode, new images are classified according to latest values of the plurality of representation parameters and the plurality of analysis parameters.

Thus, the invention provides a learning-machine architecture for joint image reconstruction and image classification that renders classification robust, particularly under low-light conditions. A principled modular design generalizes to other combinations of image formation models and high-level computer vision tasks.

BRIEF DESCRIPTION OF THE DRAWINGS

Embodiments of the present invention will be further described with reference to the accompanying exemplary drawings, in which.

REFERENCE NUMERALS

Figure 1:
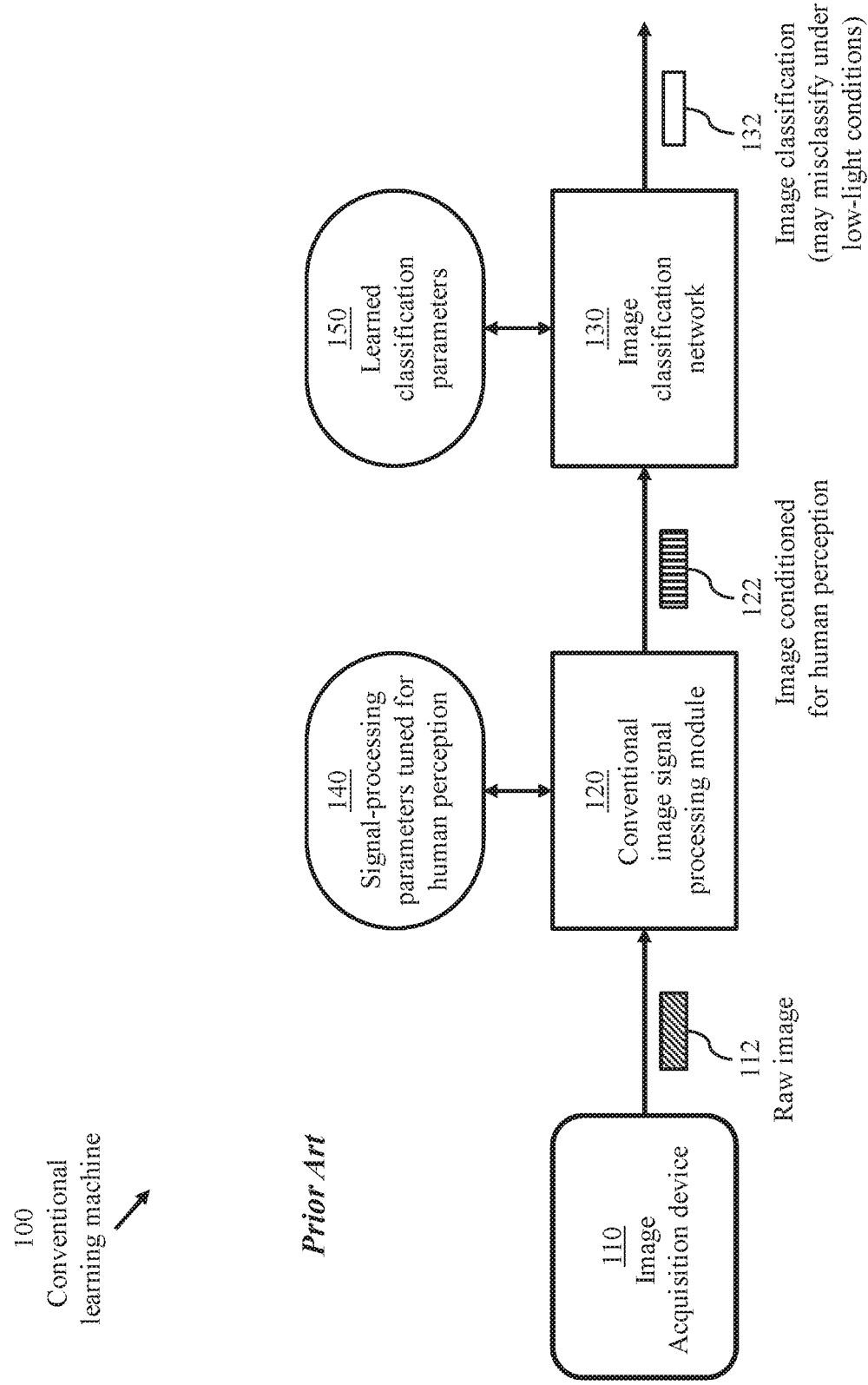
FIG. 1 illustrates a conventional learning machine for image refinement and perception.

100: A conventional learning machine for image refinement and perception
110: Image acquisition device
112: Raw image
120: Image signal processing module
122: Processed image (denoised, demosaiced, . . . )
130: Image classification network
132: Image classification
140: Signal-processing parameters
150: Learned classification parameters
200: Optimized end-to-end machine learning
210: A learning machine based on joint learning of global parameters (joint parameters) relevant to both image representation and image perception
220: General image representation network
222: Intermediate data
230: Image analysis network with parameters determined according to a global (end-to-end) optimization procedure
232: Image classification
240: Learned global (end-to-end) parameters
300: Closed-loop training of the learning machine of FIG. 2
310: Raw image, c channels, m×n pixels per channels, m, n, c being positive integers
330: Multi-channel representation of latent image
380: Backpropagated gradients
420: Variance stabilizing transform and corresponding inverse transform
430: Image representation stage
440: Soft camera projection module
450: Image projection module (U-Net stage) generating a residual connection
460: Pre-defined number of executing the image representation stage 430
480: Intermediate multi-channel representation of latent image
500: Conventional image-denoising device employing Anscombe transformation
512: Degraded raw image
520: Variance stabilizing transformation module
522: Transformed variance stabilized image (reduced variance in comparison with the raw image)
530: Gaussian denoising module
532: Denoised variance stabilized image
540: Inverse transformation module
542: Improved image with restored variance
600: Generation of multichannel image representation employing image representation network 220
620: Variance stabilizing transformation module producing an added channel (FIG. 9)
622: Transformed variance-stabilized image
624: Added channel
630: Cascaded image representation stages (U-Net stages)
632: Intermediate channels (corresponding to reduced-variance images)
640: Inverse transformation module producing a residual connection
700: Image representation based on Anscombe transform
720: Raw-image shaping unit using Anscombe's transform
722: A form of Anscombe's transform
730: Shaped image according to Anscombe's transform
750: Midway channels
760: Inverse image-shaping unit implementing unbiased inverse Anscombe's transform
762: A form of an unbiased inverse Anscombe's transform
770: Multi-channel representation $\Lambda(., \Theta)$ of latent image based on forward and inverse Anscombe's transforms
800: Inputs and outputs of a single image representation stage 430 comprising a soft camera projection module 440 and an image projection module 450 (one U-Net stage)
812: Transformed (shaped) image or output of an immediately preceding activation of an image representation stage
822: Midway image
830: Specification of image projection module (U-Net stage) including number of levels, parameters of spatial convolution, pooling, subsampling, and interpolation
844: Midway multi-channel representation of latent image
900: Processes of image transformation (shaping) producing an added channel
910: Raw image (processing of one channel illustrated)
920: Anscombe transformation process
930: Transformed image; the raw image with modified pixel values
940: Noise parameter
950: Added channel
1000: Processes of image projection module (a single U-Net stage)

1010: Output of the variance stabilizing module or output of a preceding activation of an image projection module (activation of a U-Net stage)
1020: Feature maps generated during contracting-path first-level convolution
1026: Information transfer
1028: Pooling—first level to second level
1030: Feature maps generated during expanding-path convolution from second level to first level
1040: Feature maps generated during contracting-path second-level convolution
1046: Information transfer
1048: Pooling—second level to third level
1050: Feature maps generated during expanding-path convolution from third level to second level
1058: Interpolation ("upsampling")—second level to first level
1060: Feature maps generated during contracting-path third-level convolution
1068: Interpolation ("upsampling")—third level to second level
1100: Convolution options
1110: Filter
1120: Spatial-convolution operator
1130: image of m×n pixels
1140: w×w window (w<<m, W<<n)
1150: Feature-map (no zero padding)
1160: Feature map (zero padding)
1400: Iterative and unrolled activation of image representation stages
1410: Reduced-variance image
1420: An image representation stage
1430: Termination criterion
1440: Multi-channel representation—iterative activation of image representation stage 430
1450: Multi-channel representation—unrolled cascaded activation of image representation stages 430
1500: Processes of learning machine 200
1510: Acquisition of raw images
1520: Image shaping using Anscombe transform
1525: CFA and other optical parameters, for example, optical OTF
1530: Process of soft camera projection
1540: Determining multi-channel representation of an image
1542: Decision to revisit process 1530 or proceed to process 1550
1550: Inverse Anscombe transformation
1560: Intermediate multi-channel representation
1570: Convolution process
1580: ReLU and pooling processes
1590: Perception output, including image label
1600: Continual training procedure of a learning machine
1620: Database of training images with corresponding designated classifications (labels)
1640: Global training model
1650: Learned global parameters (joint parameters relevant to both image representation network 220 and image-analysis network 230)
1660: Perception model (software instructions associated with image-image analysis network 230)
1670: Database of test images
1680: Evaluation module (software instructions)
1690: Data to be considered for training
1700: Learning machine configured for continual training and image analysis
1710: Hardware processor (or an assembly of hardware processors) executing software instructions relevant to learning-machine training
1720: Training module (software instructions)
1730: Training images (from training database)
1740A: Memory device storing learned global parameters (joint parameters) being updated
1740B: Memory device storing learned global parameters (joint parameters) previously determined
1741: Training segment of learning machine 1700
1742: Operational segment of learning machine 1700
1743: Link for periodic, or state driven, update of content of memory 1740B
1750: Hardware processor (or an assembly of hardware processors) executing software instructions relevant to post-training perception
1760: Image analysis network (software instructions)
1770: Incoming images to be classified
1780: Image classification/label
1800: Illustration of raw-image shaping (transformation)
1810: Pixels of raw image
1820: Pixel-shaping function
1830: span of raw pixels
1840: Span of shaped pixels
1850: Shaped pixels
1900: Further illustration of raw-image shaping
1940: Span of shaped pixels
1950: Shaped pixels
2000: Training data
2010: Image index
2020: Image classification and other perception information
2100: Overview of the learning machine of FIG. 2
2120: Learning depot
2124: Training data
2128: Models' weights and other learned parameters
2140: Data to add to learning dept 2120
2190: Image classification (likelihood vector corresponding to candidate objects)

DETAILED DESCRIPTION

FIG. 1 illustrates a conventional learning machine 100 for image refinement and perception. Learning machine 100 comprises at least one hardware processor (not illustrated) coupled to at least one memory device storing:
  processor-executable instructions forming an image signal processing module 120;
  processor-executable instructions forming an image classification network 130;
  signal-processing parameters 140, generally tuned for human perception; and
  learned classification parameters 150.

Module 120 is configured for denoising and demosaicing images in addition to performing other image improvement functions according to signal processing parameters 140. Network 130 is configured to classify an image according to the learned classification parameters 150. Upon receiving a raw image 112 from an image acquisition device 110, module 120 produces a refined image 122 which is supplied to module 130 to determine a perceived classification 132 of the raw image 112. A digital camera may save images in a raw format suitable for subsequent software processing. Thus, processes of demosaicing, denoising, deblurring may be performed to reconstruct images.

The signal processing parameters 140 and the learned classification parameters are determined independently.

Figure 2:
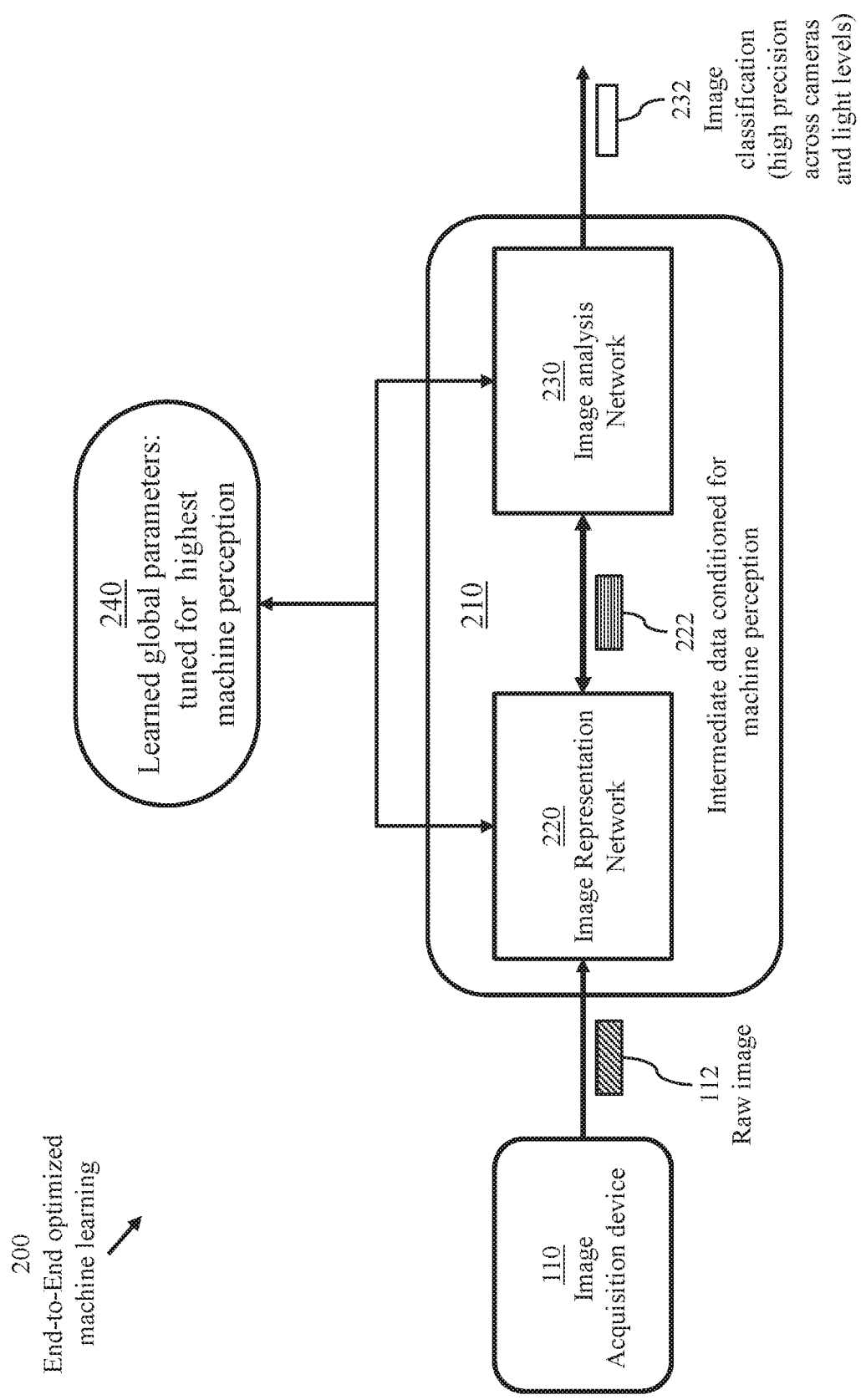
FIG. 2 illustrates a learning machine based on joint learning of global parameters (joint parameters) relevant to image refinement and perception, in accordance with an embodiment of the present invention.

FIG. 2 illustrates a system 200 of optimized end-to-end machine learning based on a novel learning machine 210 performing processes of image refinement and perception. The learning machine receives raw color filter array (CFA) sensor data and determines corresponding image labels.

Learning machine 210 comprises at least one hardware processor (not illustrated) coupled to at least one memory device storing:
- processor-executable instructions forming an image representation network 220 (detailed in FIG. 4);
- processor-executable instructions forming an image analysis network 230; and
- learned global parameters (joint parameters) 240 tuned for high machine perception.

The term "image analysis" refers to processes encompassing object detection, tracking, scene understanding, etc.

Upon receiving a raw image 112 from an image acquisition device 110, the image representation network 220 produces intermediate data 222 which is supplied to image analysis network 230 to determine a perceived classification 232 of the raw image 112. The intermediate data 222 comprises multiple channels.

The learned global parameters (joint parameters) 240 comprise parameters specific to the image representation network 220 and parameters specific to the image analysis network 230. Thus, learning machine 210 is configured according to joint learning of global parameters relevant to image refinement (denoising, demosaicing, . . . ) and perception (including image classification).

There are two main distinctive features of the novel learning machine 210. The first is the global optimization and the resulting global characterizing parameters. The second is the replacement of a conventional image signal processing module 120 with the image representation network 220. Referring to FIG. 1, a conventional image classification network 130 of FIG. 1 processes training images which have been refined (denoised, demosaiced) to produce learned data 150. In operation (post training or at an advanced stage of training), the conventional image classification network 130 of FIG. 1 may be viewed as a black box trained to receive a single image, which has been refined, and use the learned data 150 to classify (label) the image. In contrast, the image representation network 220 produces multiple channels. Thus, network 230 processes multiple channels representing an image while network 130 processes an image.

Figure 3:
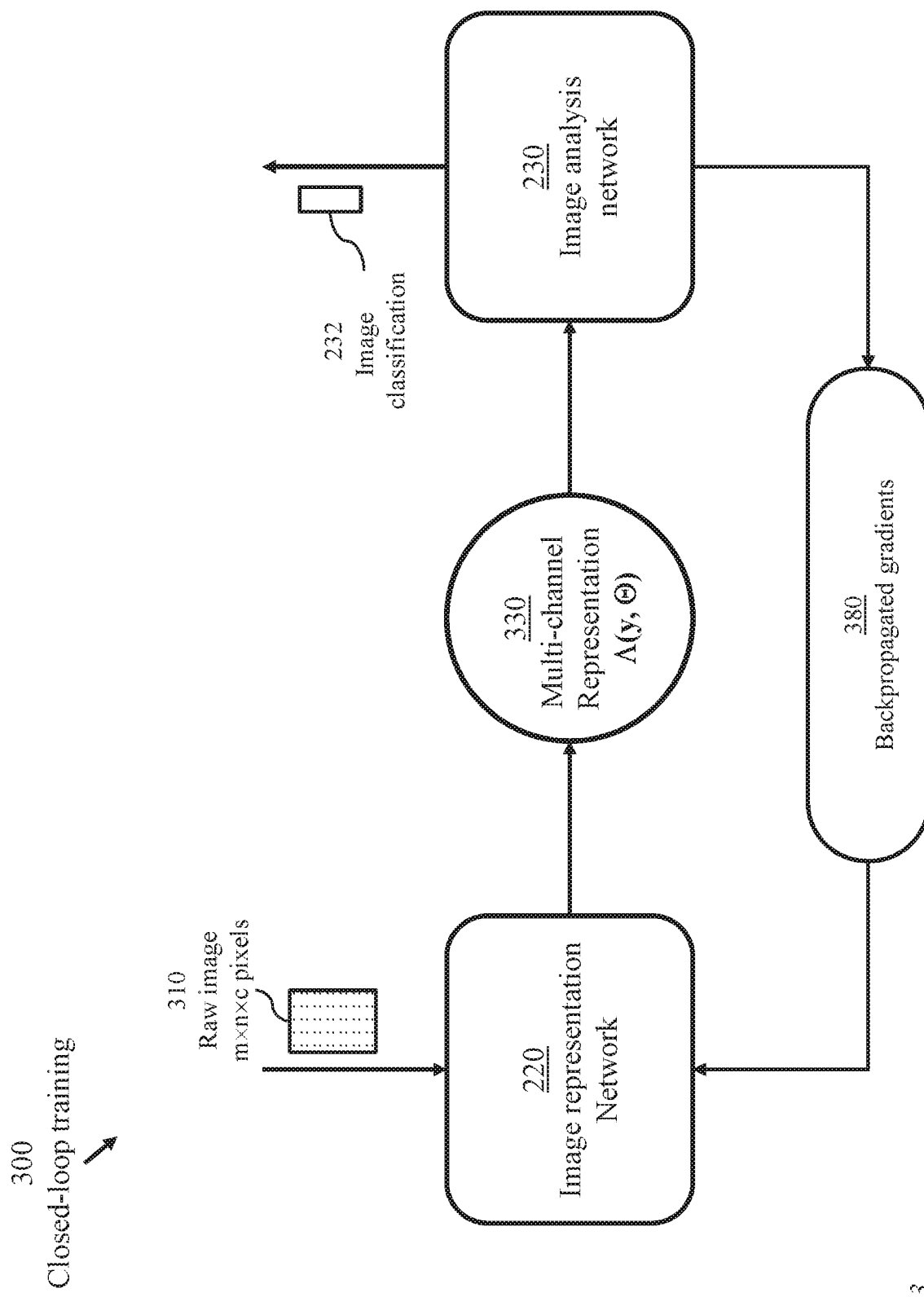
FIG. 3 illustrates a closed-loop training system comprising an image representation network generating a multi-channel representation of a latent image to be supplied to an image analysis module, in accordance with an embodiment of the present invention.

FIG. 3 illustrates a closed-loop training system 300 comprising an image representation network 220 generating a multi-channel image representation supplied to an image analysis network. Image representation network 220 produces a multiple-channel representation 330 $\Lambda(., \Theta)$ for each input channel 310. Image analysis network 230 determines an image classification 232 and gradients are backpropagated across all layers.

Figure 4:
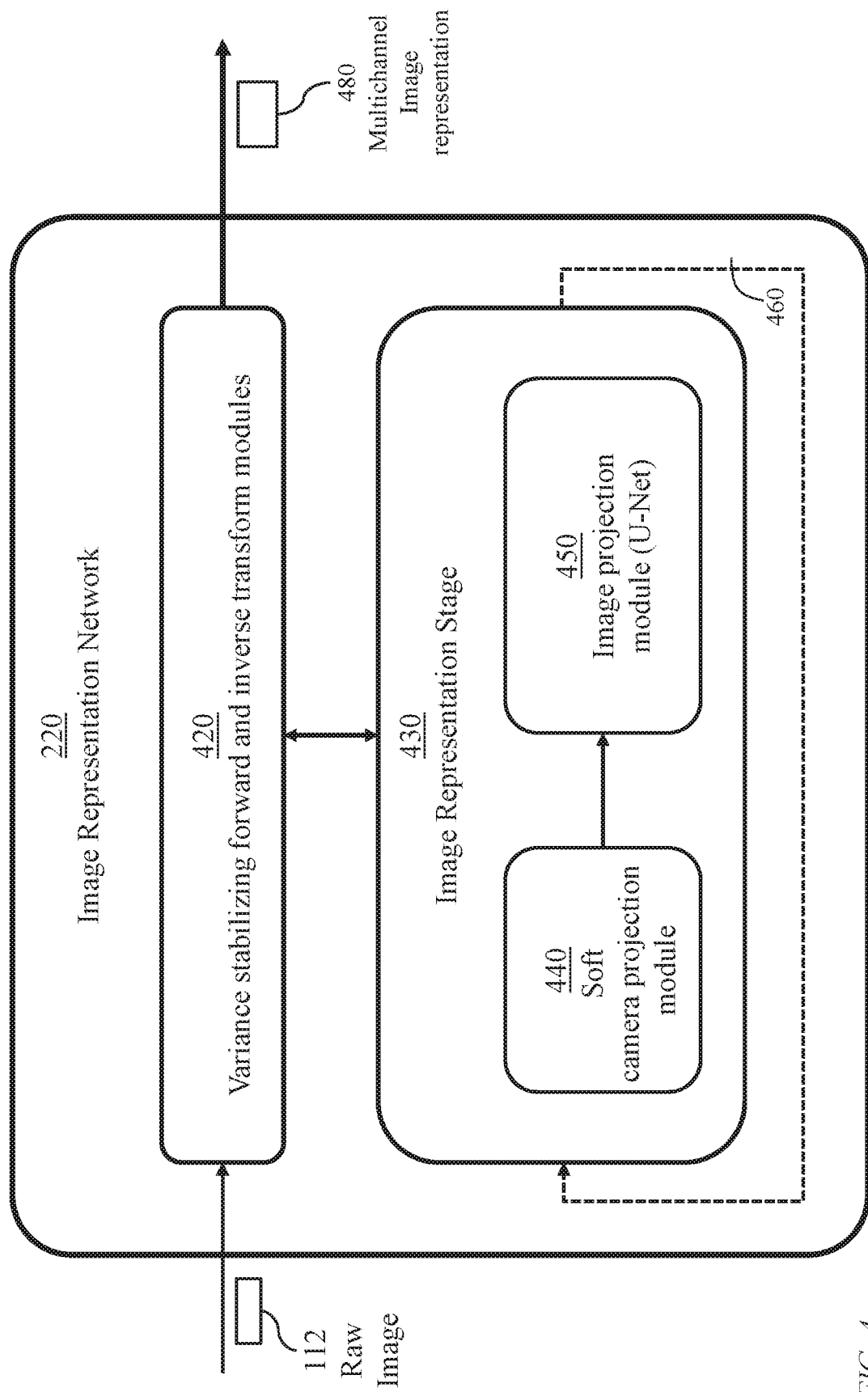
FIG. 4 illustrates an image representation network used within the learning machine of FIG. 2, in accordance with an embodiment of the present invention.

FIG. 4 details the image representation network 220 of the learning machine of FIG. 2. The network 220 receives a raw image 112 from an image acquisition source and generates a multichannel representation 480 of the image to be used in an image perception stage (image analysis/classification stage) for identifying the content of the raw image 112.

Network 220 relies on repetitive activation of an image projection module 450, hereinafter referenced as module 450, which is adapted from a U-net. The U-Net is a heuristic architecture that has multiple levels, and therefore exploits self-similarity of images (in contrast to single-level architecture). A soft camera projection module 440 precedes module 450 and executes a process which permits explicit use of a color filter array (CFA) hence enabling generalization to different CFAs, or blur kernels, of different sensors. The soft camera projection module 440 together with module 450 form an image representation stage 430. The image representation stage 430 may be activated recursively (feedback loop 460). The number of turns of activation is a design choice. Alternatively, reactivation of the image representation stage may be terminated upon satisfying a specific user-defined criterion.

The raw image 112 is preferably variance stabilized prior to the repetitive activation of the image representation stage 430. Thus, the image representation network 430 employs a variance stabilizing module 420 to modify the values of pixels of the raw image 112 and a corresponding inversion module 470 to reverse the effect of initial pixel modification.

Figure 5:
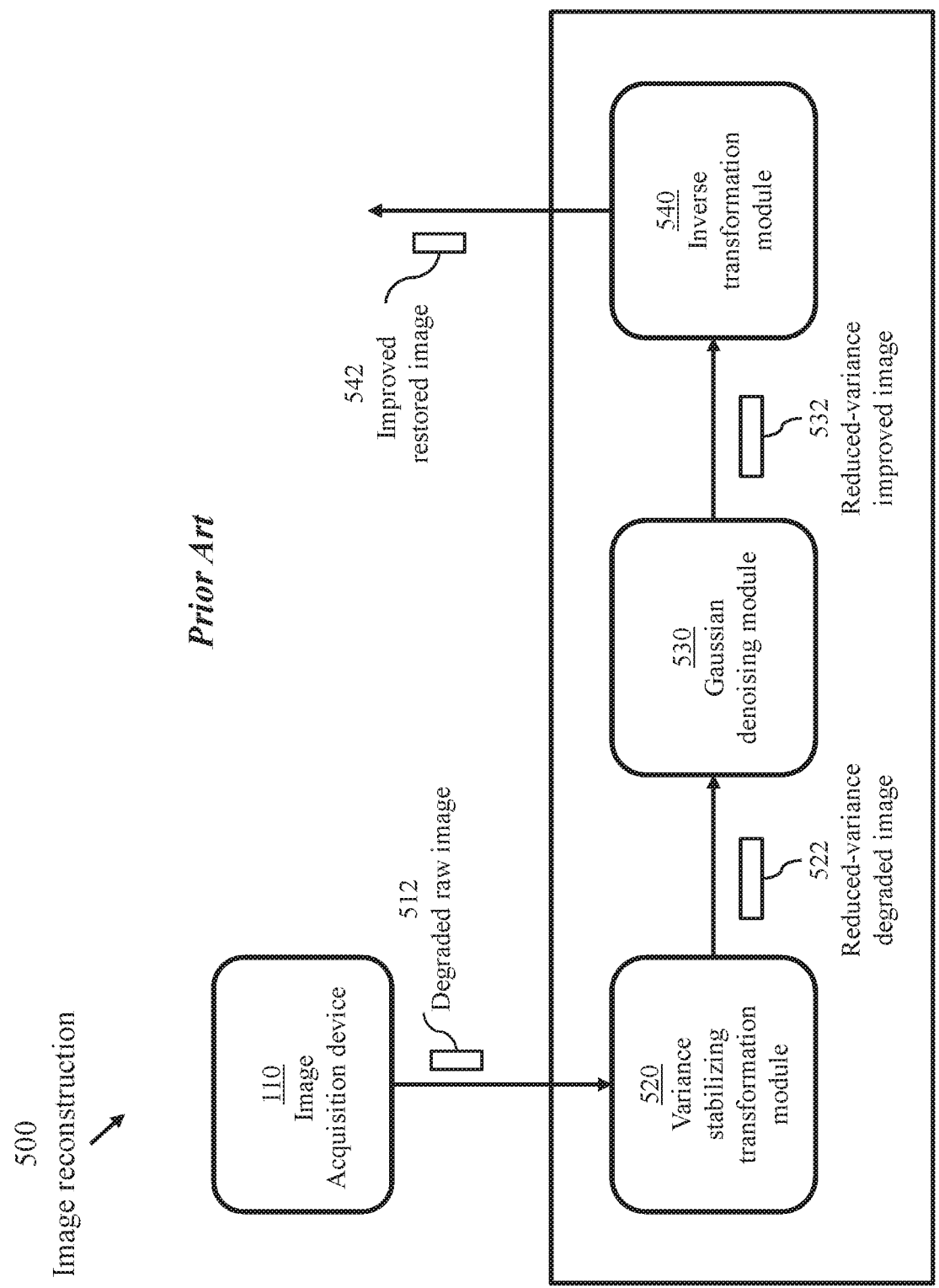
FIG. 5 illustrates a prior-art image-denoising device employing variance-stabilizing transformation module, a Gaussian denoising module, and an inverse transformation module.

FIG. 5 illustrates a prior-art image-denoising apparatus 500 employing a variance-stabilizing transformation module 520, a Gaussian denoising module 530, and an inverse transformation module 540. The variance stabilizing transformation module 520 applies Anscombe's transform to a raw image 112 received from an image-acquisition device 110 to produce a transformed variance stabilized image 522 of reduced variance in comparison with the raw image. A Gaussian denoising module 530 produces a denoised variance stabilized image 532. Inverse transform module 540 corrects the shape of the image to produce an improved image of restored variance 542.

Figure 6:
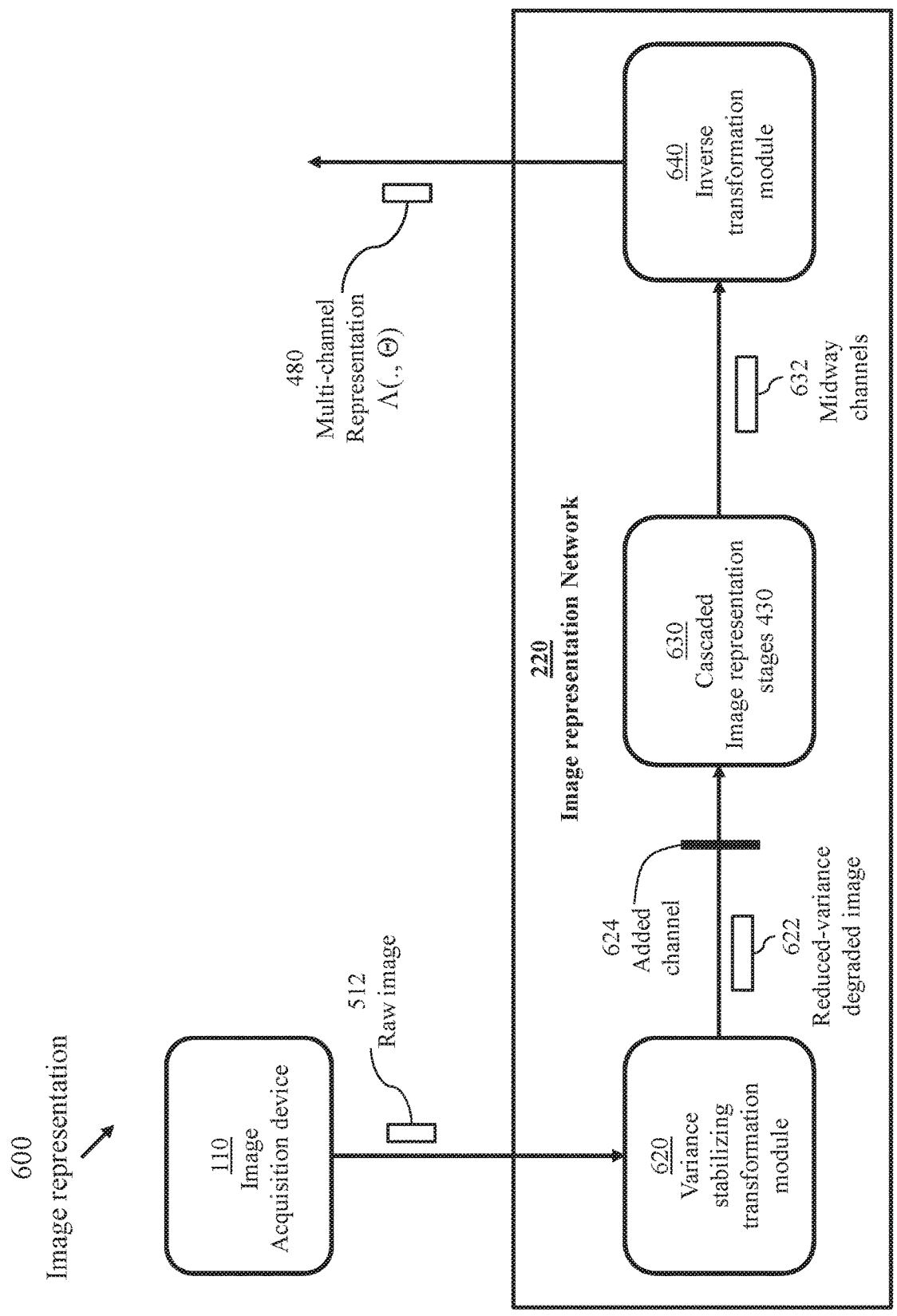
FIG. 6 illustrates further details of the image representation network of FIG. 4, in accordance with an embodiment of the present invention.

FIG. 6 illustrates processes 600 of generation of multichannel image representation employing image representation network 220 comprising variance-stabilizing transformation module 620, a module 630 of cascaded image representation stages 430, and an inverse transformation module 640.

Figure 9:
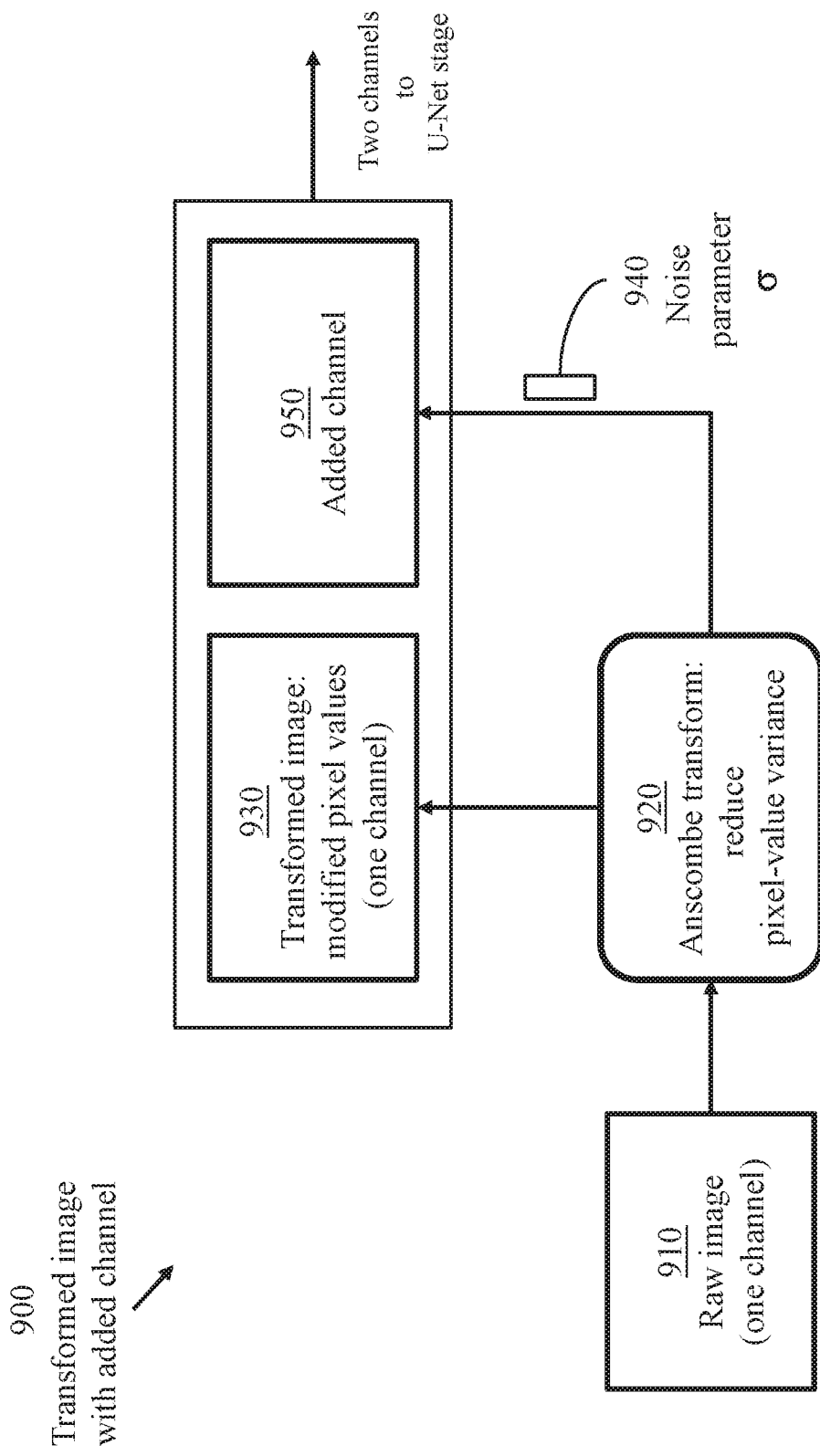
FIG. 9 illustrates pixel-value variance-stabilizing based on Anscombe's transformation producing an added channel, in accordance with an embodiment of the present invention.

The variance stabilizing module 620 modifies the values of the pixels of a raw image 112 received from an image acquisition device 110 yielding a transformed variance stabilized image 622 and an added channel 624 as illustrated in FIG. 9. Image 622 and channel 624 are processed through a cascade 630 of image representation stages 430 as detailed in FIG. 14 to produce midway multiple intermediate channels 632. The inverse transformation module 640 processes the midway channels 632 to generate multiple intermediate channels 642 of proper variance in addition to a residual connection.

Thus, the image representation network 220 applies an optimization algorithm that reconstructs a latent intermediate representation from noisy, single-channel, spatially-subsampled raw measurements. In contrast to standard convolutional neural network models, the image representation network 220 renders the perception light-level independent.

The joint image representation and perception problem may be formulated as a bilevel optimization problem with an outer objective function L (classification loss function) associated with the image analysis network 230 and an inner objective function G associated with the image representation network 220. The bilevel optimization problem may be formulated as:

$$\min_{\Theta, v} L(\Lambda(\gamma, \Theta), x, v)$$

Subject to:

$$\Lambda(y, \Theta) = \operatorname{argmin}_x G(x, y, \Theta),$$

where Λ minimizes the inner objective function G. The output of the image representation network is a multi-channel intermediate representation Λ(y, Θ), which is supplied to the image analysis network 230. Here the parameters v of the image analysis network are absorbed in L as a third argument.

Figure 7:
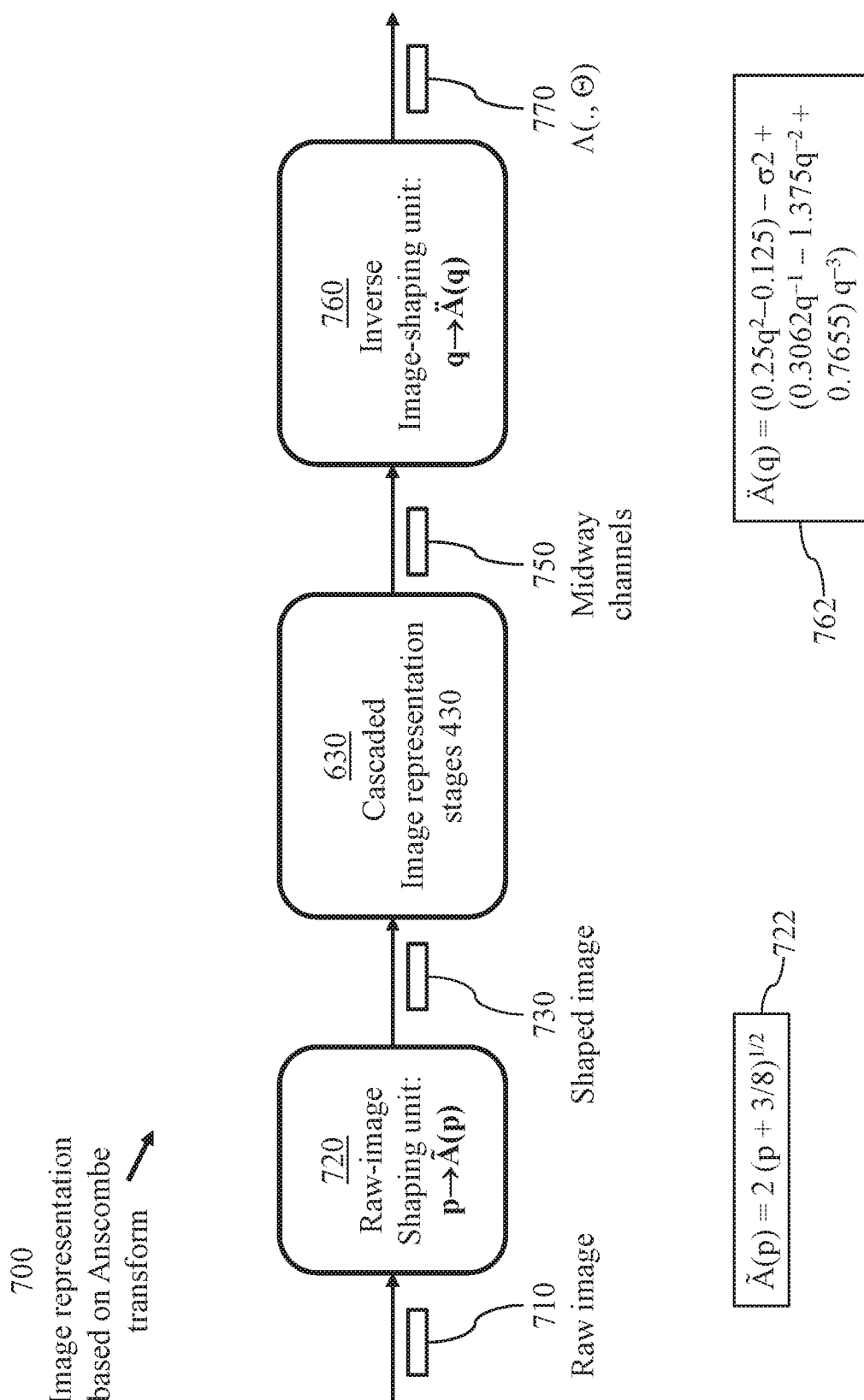
FIG. 7 illustrates image representation based on Anscombe's transformation and inverse Anscombe's transformation, in accordance with an embodiment of the present invention.

FIG. 7 illustrates an image representation network 700 (corresponding to general image representation network 220) employing an Anscombe image transformation module 720 (corresponding to variance stabilizing module 620), the cascade 630 of image representation stages 430, and an Inverse Anscombe transformation module 760 (corresponding inversion module 640).

Module 720 transforms a raw image 110 to a shaped image 730 so that a pixel of value p, $0 \le p < p_{max}$, is replaced with a pixel of value $\hat{A}(p)$; a typical value of $p_{max}$ is 255. The cascade 630 (of image representation stages 430) generates multiple midway channels 750 corresponding to the shaped image 730. Module 760 offsets the effect of pixel shaping and produces a multi-channel representation 770 of a latent image to be supplied to image analysis network 230.

According to one implementation, module 720 replaces a pixel of raw image 710 of value p with a pixel of value $\hat{A}(p)$ determined as: $\hat{A}(p) = 2(p+\frac{3}{8})^{1/2}$. Module 760 Replaces a Pixel of value q of each of the midway channels 750 with a pixel of value $\tilde{A}(q)$ determined as:

$$\tilde{A}(q) = (0.25\ q^2 - 0.125) - \sigma^2 + (0.3062 q^{-1} - 1.375 q^{-2} + 0.7655 q^{-3}).$$

Alternative variance stabilizing transforms $\tilde{A}(p)$ and corresponding inverse transforms $\tilde{A}(q)$ are known in the art.

Figure 8:
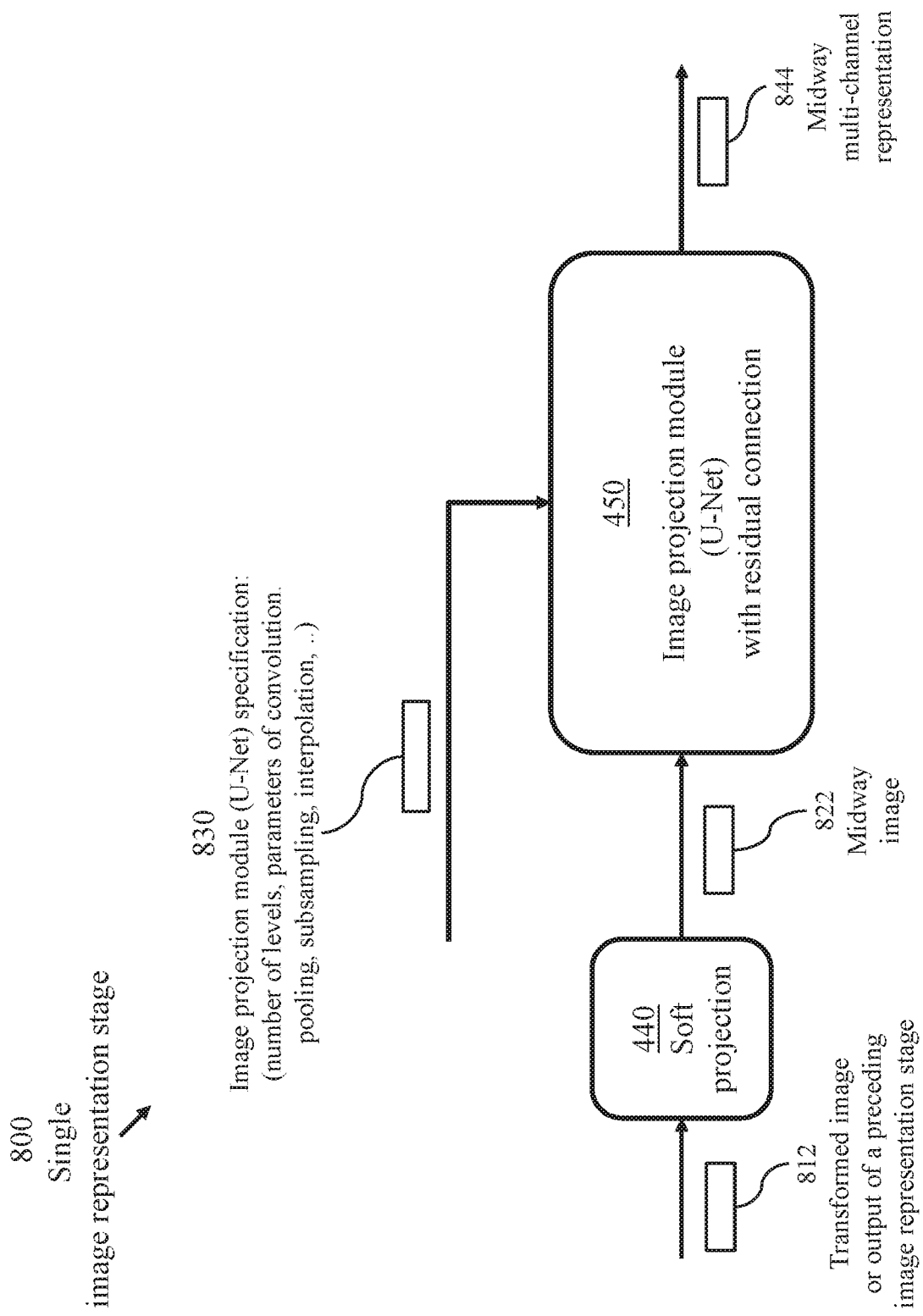
FIG. 8 illustrates inputs and outputs of an image representation stage of the image representation network of FIG. 4, in accordance with an embodiment of the present invention.

FIG. 8 illustrates inputs and outputs 800 of a single image representation stage 430 comprising a soft camera projection module 440 and an image projection nodule 450 (one U-Net stage). The soft camera projection stage 440 processes a transformed (shaped) image 812 to produce a midway image 822 which is supplied to image projection module 450. A memory device stores specification 830 of the image projection module including number of levels, parameters of spatial convolution, pooling, subsampling, and interpolation. The image projection module 450 processes the midway image 822 to produce a midway multichannel representation 844.

FIG. 9 illustrates processes 900 of image transformation (image shaping, pixel-variance-stabilizing) based on Anscombe's transformation producing an added channel. An Anscombe transformation process 920 is applied to a raw image 910 of one channel to produce a transformed image 930. An added channel 950 is also generated based on a resulting noise parameter 940.

Figure 10:
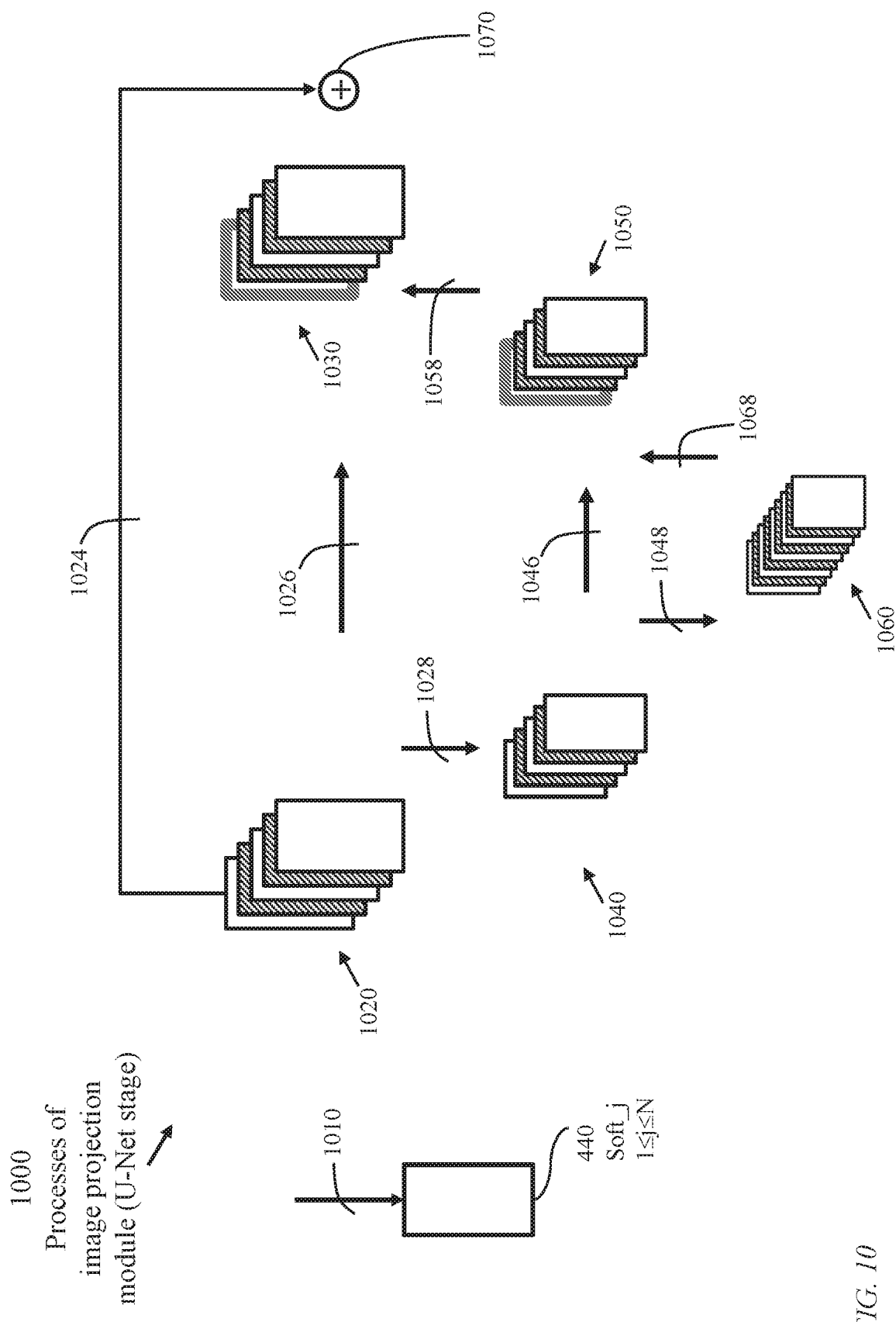
FIG. 10 illustrates an image projection module (a U-Net stage) configured as a contracting path and a symmetric expanding path, the contracting path capturing context and the expanding path enabling accurate localization.

FIG. 10 illustrates processes 1000 of image projection module (a single U-Net stage) configured as a contracting path and a symmetric expanding path. The contracting path captures context and the expanding path enables accurate localization.

The contracting path is a convolutional network where application of two 3×3 unpadded convolutions is repeated. A rectified linear unit (ReLU) and a 2×2 max pooling operation with stride 2 for downsampling succeed each convolution. At each downsampling, the number of feature channels is doubled.

In the expanding path, an upsampling process of the feature map is followed by a 2×2 convolution that halves the number of feature channels, a concatenation with the correspondingly cropped feature map from the contracting path, and two 3×3 convolutions, each followed by a ReLU. The cropping is necessary due to the loss of border pixels in every convolution. At the final layer a 1×1 convolution is used to map each multi-component feature vector to the desired number of classes.

A soft camera projection process 440 is applied to an output 1010 of the variance stabilizing module 620 or output of a preceding activation of an image projection module (activation of a U-Net stage).

Processes 1000 of image projection module 450 (a single U-Net stage) include:
generating feature maps 1020 during contracting-path first-level convolution Information transfer 1026;
Pooling 1028 from the first level to the second level of the contracting path; generating feature maps 1040 during contracting-path second-level convolution Information transfer 1046;
Pooling 1048 from the second level to third level of the contracting path; generating feature maps 1060 during contracting-path third-level convolution;
Interpolation ("upsampling") 1068 from third level to second level of expanding path; generating Feature maps 1050 during expanding-path second convolution;
Interpolation ("upsampling") 1058 from second level to first level; and generating feature maps 1030 during expanding-path first-level convolution first level.

Figure 11:
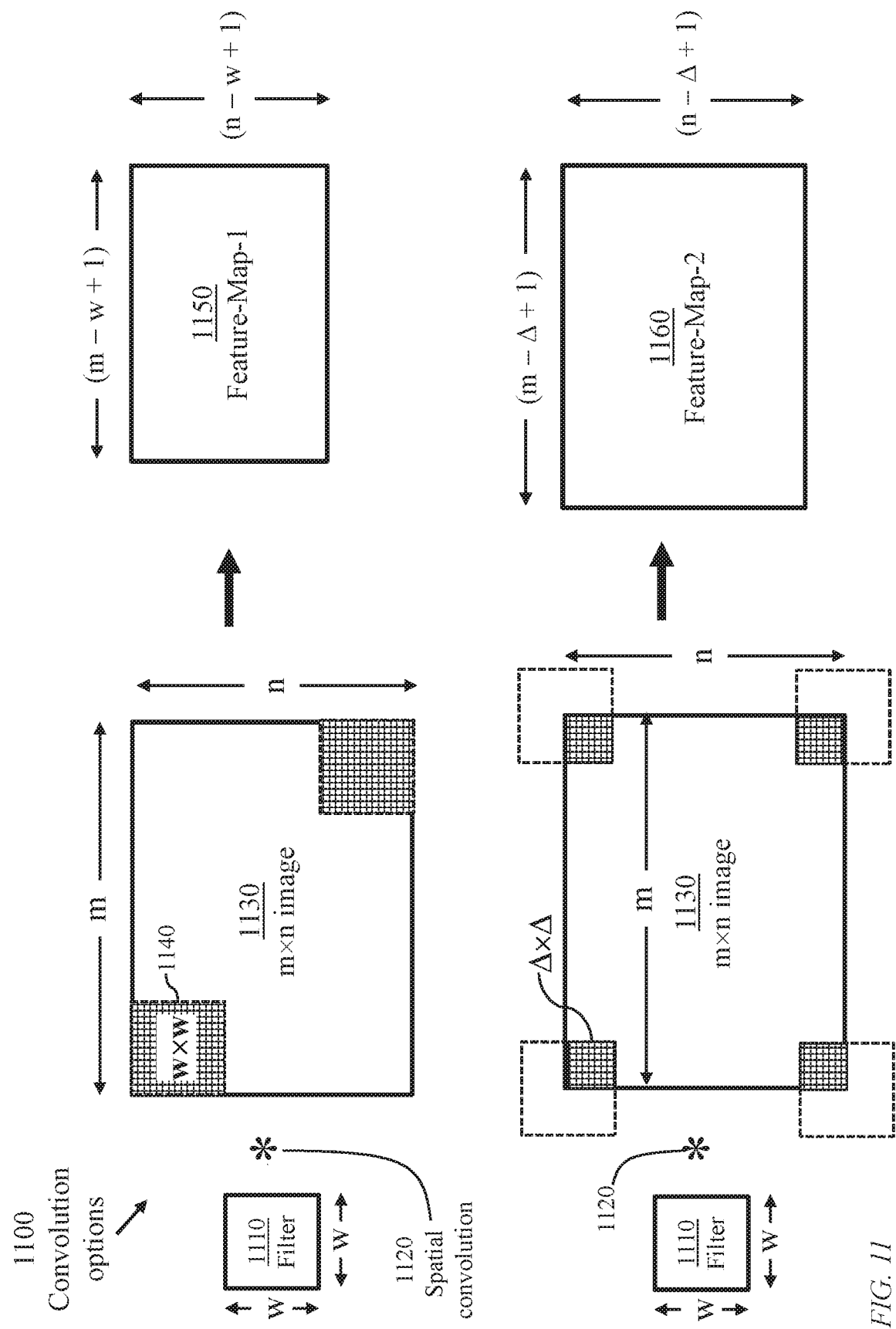
FIG. 11 illustrates convolution options for use in the image analysis network of the learning machine of FIG. 2.

FIG. 11 illustrates options 1100 of convolution processes used in the image projection module (U-Net stage) and the image analysis network 230. An image, or generally a channel, 1130 of dimension m×n pixels is spatially convolved with a filter 1110 of dimension w×w pixels to produce a feature map according to conventional spatial-convolution operator 1120. Typically, w<<m, and w<<n.

According to a first spatial convolution scheme, a window 1140 of pixels of a filter slides within the m×n pixels so that the filter is completely embedded thus yielding a feature map 1150 of dimension (m−w+1)×(n−w+1) pixels. According to a second spatial convolution scheme, the window of pixels of the filter slides within the m×n pixels so that the intersection region exceeds Δ×Δ pixels, 0<Δ<w, yielding a feature map 1160 of dimension (m−Δ+1)×(n−Δ+1) pixels.

Figure 12:
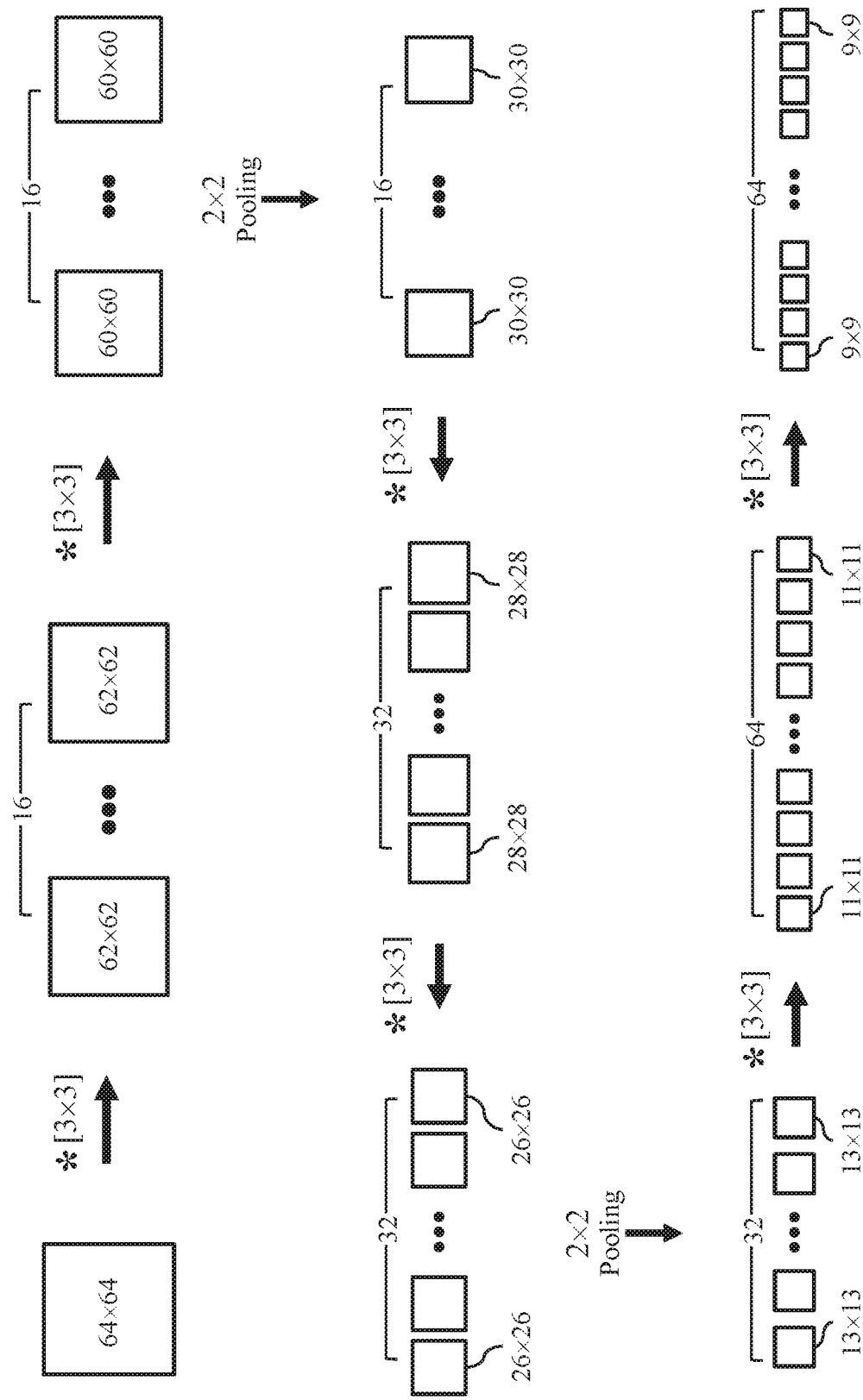
FIG. 12 illustrates the contracting path of an image projection module (a U-Net stage)

FIG. 12 illustrates the contracting path of image projection (U-Net). An image of dimension 64×64 pixels (m=n=64) is convolved with 16 filters each of dimension 3×3 pixels (w=3) to yield 16 feature maps each of dimension 62×62 pixels (m−w+1=62). Each of the 62×62 is convolved with a filter of 3×3 pixels to yield a corresponding 62×62 feature map.

Figure 13:
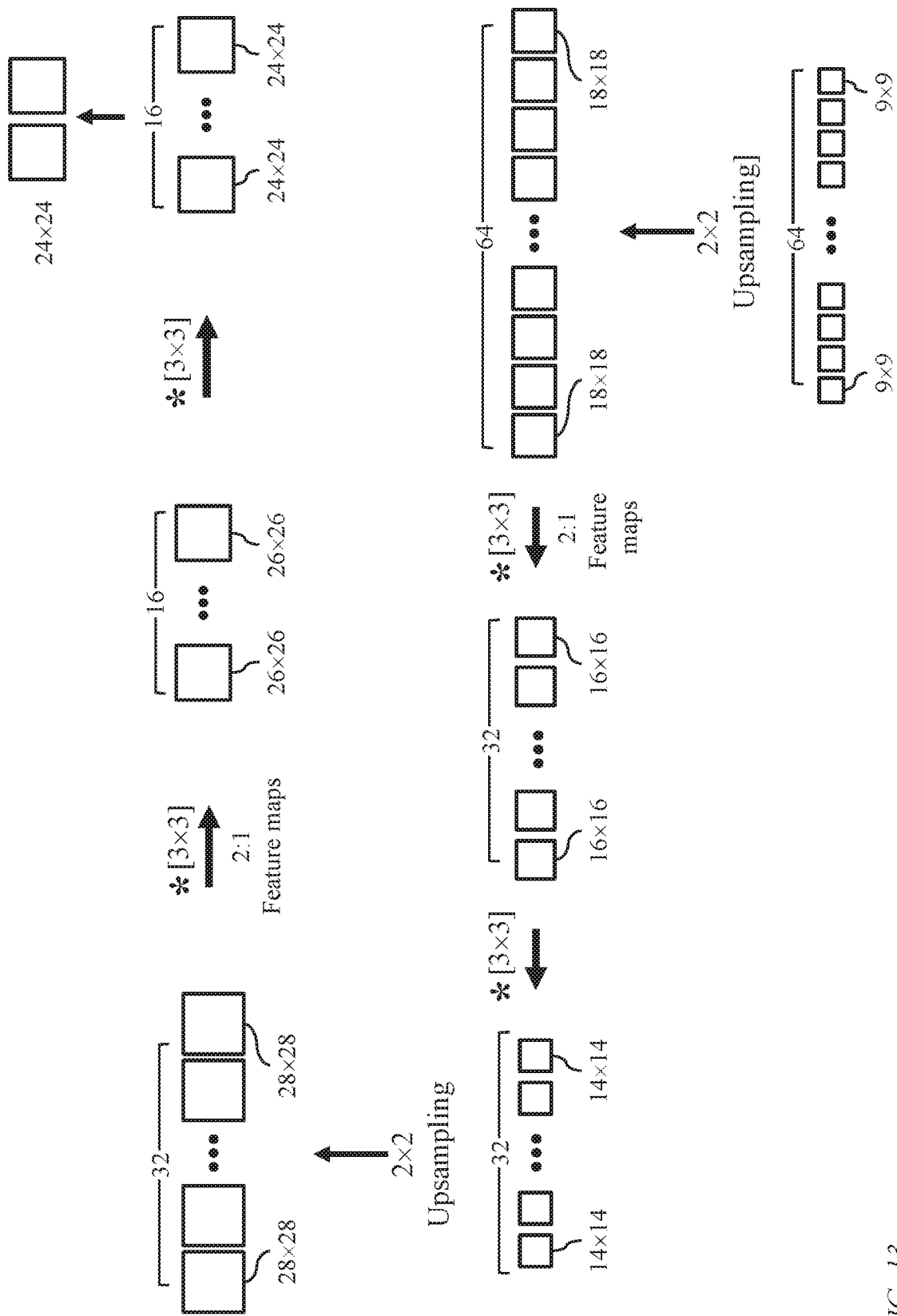
FIG. 13 illustrates the expanding path of the image projection module.

FIG. 13 illustrates the expanding path of image projection.

Figure 14:
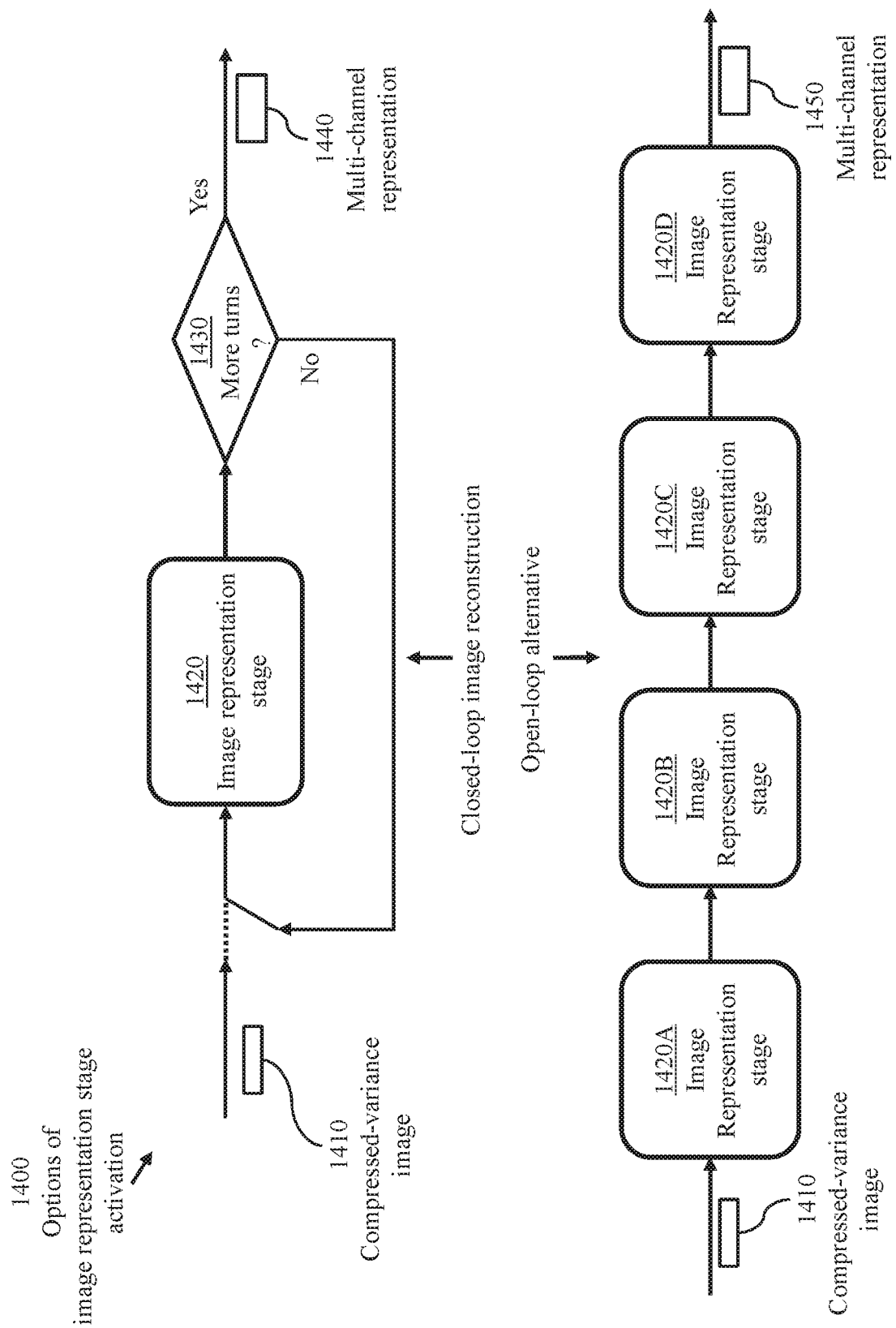
FIG. 14 illustrates iterative and unrolled activation of image representation stages, in accordance with an embodiment of the present invention.

FIG. 14 illustrates options 1400 of activation of image representation stages 430. A module implementing an image representation stage 1420 may be executed repeatedly, starting with a variance-stabilized image 1410 derived from a raw image until a termination criterion 1430 is satisfied to yield a multi-channel representation 1440. Initially, the image representation stage processes transformed image 1410 and subsequently the output of each image representation stage is reprocessed. An image representation stage 430 comprises a soft camera projection module 440 and an image projection module U-Net) 450 as illustrated in FIG. 4. As illustrated in FIGS. 8, 10, 12, and 13, the image projection module permits specifying operational parameters such as a number of levels, convolution windows, pooling steps, and upsampling (interpolation) steps. In the iterative execution of the image representation stage 430, different parameters may be specified for successive activations. A predefined termination criterion 1430 may be applied. Alternatively, the number of times the image representation stage is to be executed may be predefined as illustrated for the case of four execution cycles where successive image representation stages 1420, individually identified as 1420A, 1420B, 1420C, and 1420D, are executed to yield a multi-channel representation 1450. The operational parameters for each of the four stages are preferably determined according to a global optimization process.

Figure 15:
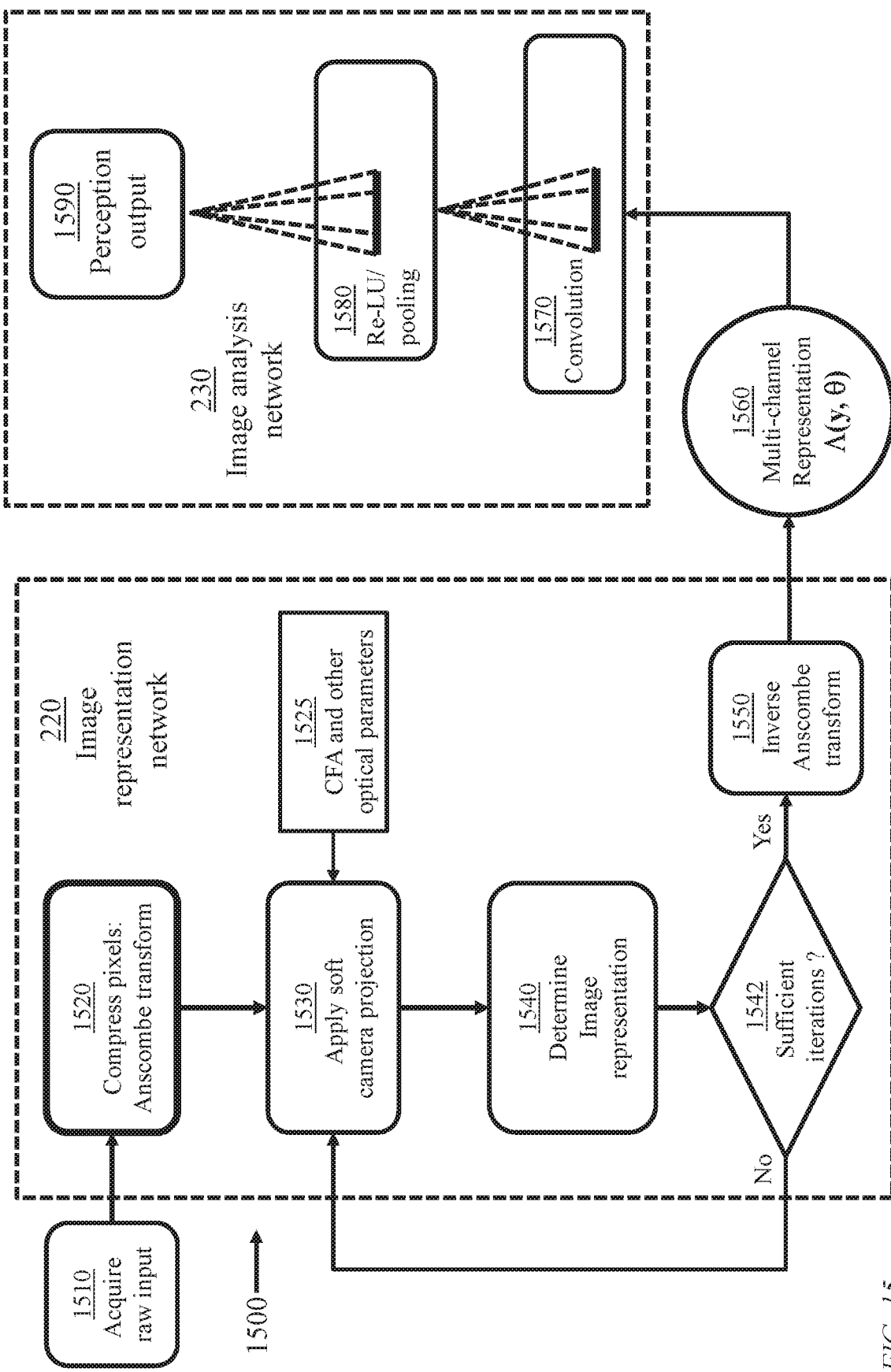
FIG. 15 illustrates details the learning machine of FIG. 2.

FIG. 15 illustrates processes 1500 performed at learning machine 210. Process 1510 acquires raw images from image acquisition devices 110 which are supplied to image representation network 220. For a selected raw image, process 1520 performs image shaping using, for example, the Anscombe transform. Process 1530 performs a process of soft camera projection (module 440) which permits explicit use of a color filter array (CFA), hence enabling generalization to different CFAs, or blur kernels, of different sensors.

Process 1540 executes the image projection module (a U-Net stage) 450 to determine an image representation. Process 1542 determines whether further activation of processes 1530 and 1540 are beneficial. The decision of process 1542 may be based on a predefined criterion. However, in order to facilitate end-to-end optimization to jointly determine optimal parameters of module 450 and weights of the image analysis network 230, it is preferable to predefine the number of cycles of executing process 1530 and 1540 where the parameters may differ from one cycle to another. A conjectured preferred number of cycles is eight. Process 1550 performs an unbiased inverse transform to offset the effect of pixel shaping of process 1520. Process 1520 may be based on the Anscombe transform, in which case process 1550 would be based on an unbiased inverse Anscombe transform as illustrated in FIG. 7. Process 1550 determines a multichannel representation 1560 which is further processed in image analysis network 230. The image analysis network 230 performs processes of spatial convolution 1570, Re—Lu and pooling 1580, etc., well known in the art, to produce a perception output 1590 including an image label.

The invention provides an end-to-end differentiable architecture that jointly performs demosaicing, denoising, deblurring, tone-mapping, and classification. An end-to-end differentiable model performs end-to-end image processing and perception jointly.

The architecture illustrated in FIG. 15 combines jointly learned image representation network 220 and an image projection network 230, taking raw sensor CFA data as input and determining image labels. A single differentiable model generalizes across cameras and light levels.

Figure 16:
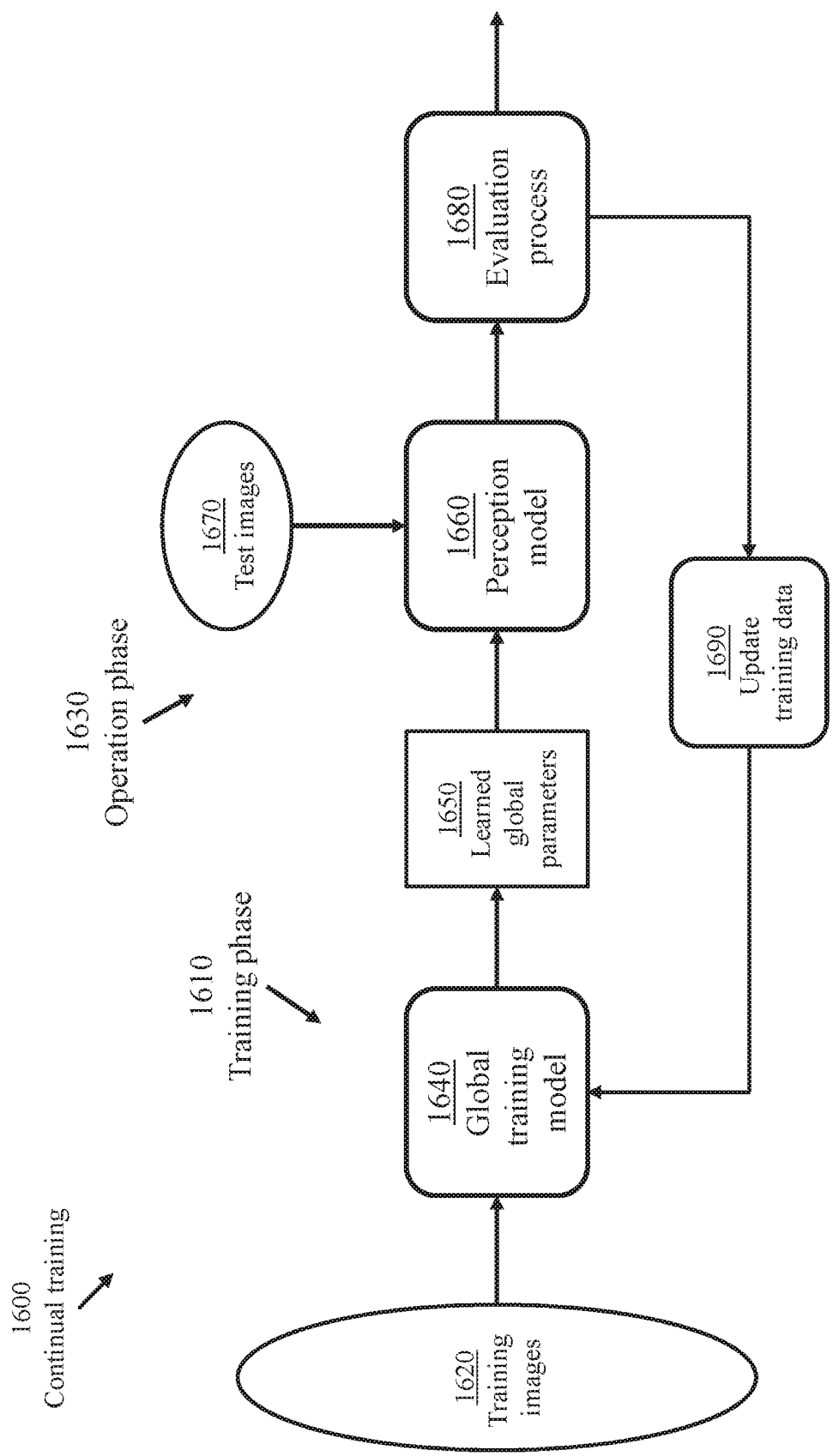
FIG. 16 illustrates a system for continual learning comprising a training phase and an operation phase.

FIG. 16 illustrates a learning system 1600 for continual machine learning comprising a training phase and an operation phase. A global training model 1640 uses database 1620 containing training images and corresponding designated classifications (labels) to produce learned global parameters (joint parameters) 1650 relevant to both the image representation network 220 and the image-image analysis network 230. Perception model 1660 comprises software instructions associated with image-image analysis network 230. The model processes test images 1670. Evaluation module 1680 determines a classification success level for each test image and selects test images 1690 to be considered for enhancing the training database.

Figure 17:
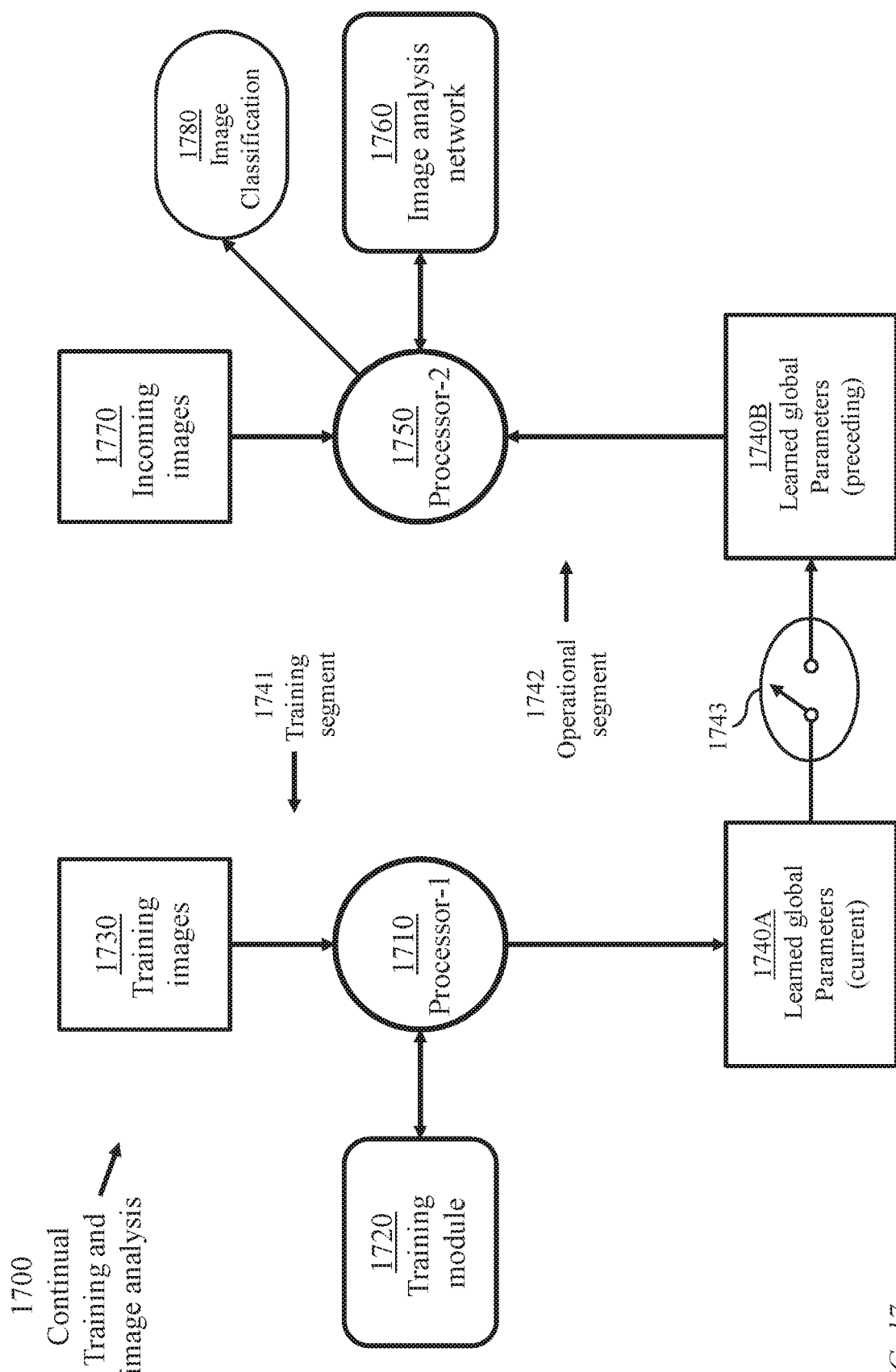
FIG. 17 illustrates an implementation of the system of FIG. 16 enabling concurrent training and operation, in accordance with an embodiment of the present invention.

FIG. 17 illustrates an implementation 1700 of the learning system of FIG. 16 enabling concurrent training and operation of a learning machine. The system employs a hardware processor 1710 (or an assembly of hardware processors) executing software instructions relevant to training and a hardware processor 1750 (or an assembly of hardware processors) executing software instructions relevant to post-training perception.

A memory device storing a training module 1720 comprising software instructions, a memory device storing training images 1730, and a memory device 1740A are coupled to processor 1710 forming a training segment 1741 of the learning system. A memory device storing an image analysis network 1760 comprising software instructions, a buffer storing incoming images 1770 to be analysed and classified, and a memory device 1740B are coupled to processor 1750 forming an operational segment 1742 of the learning system which determines a classification (a label) for each incoming image.

The training segment 1741 produces continually updated learned global parameters (joint parameters) which are stored in memory device 1740A. The learned global parameters may be transferred, through an activated link 1743, to memory device 1740B periodically or upon completion of significant updates.

The training segment 1741 (first mode) relates to end-to-end training. The operational segment 1742 (second mode) relates to actual use of the trained machine. Alternatively, the learning machine may be operated in a cyclic time-multiplexed manner to train for a first period and perform perception tasks, for which the machine is created, during a second period. Thus, the learning machine may perform a cyclic bimodal operation so that during a first mode the training images 1730 are updated and the training module 1720 is executed, and during a second mode, new images 1770 are analysed and classified according to latest values of learned parameters.

Figure 18:
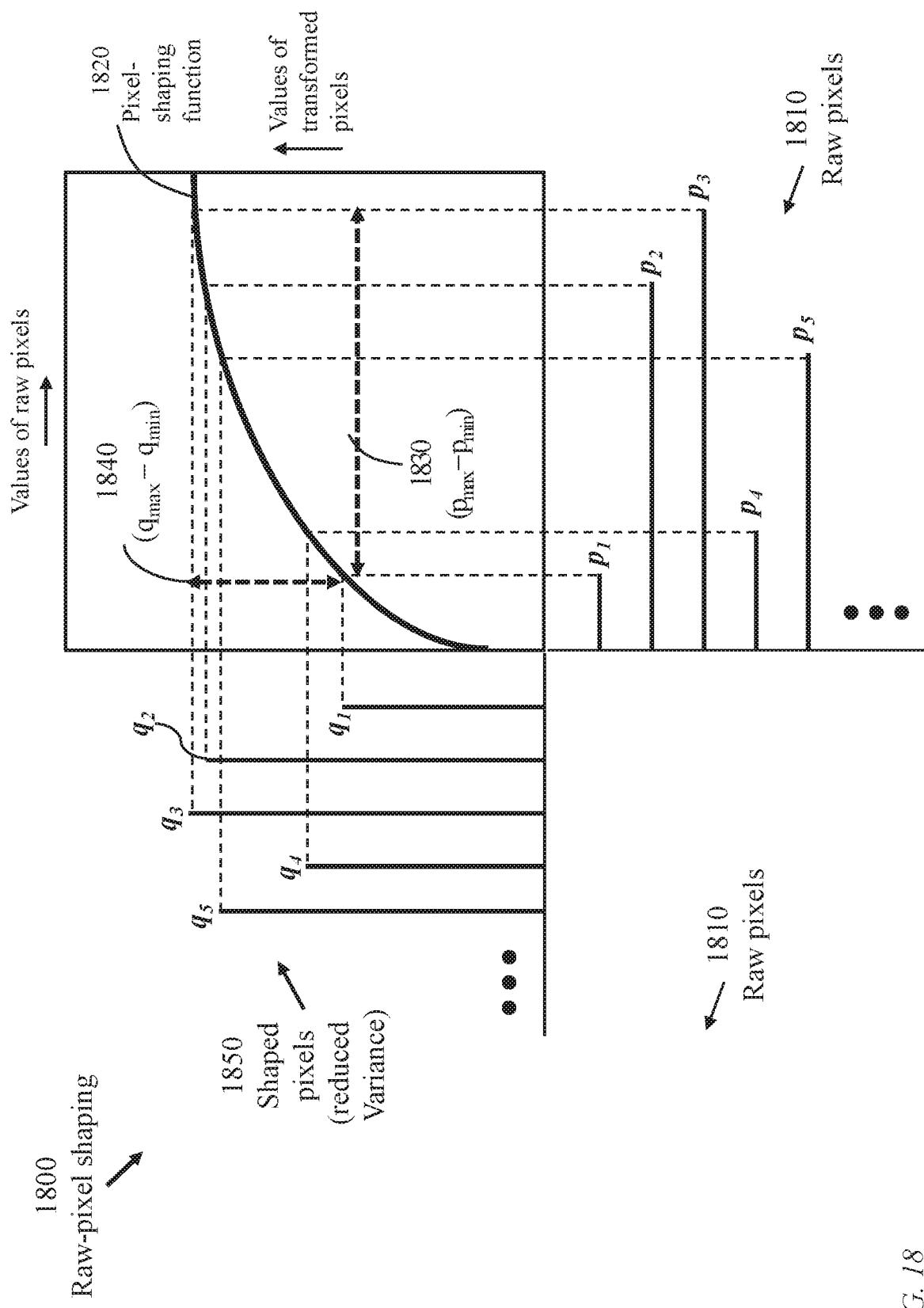
FIG. 18 illustrates general transformation of pixel values of an image to produce pixel values of lower coefficient of variation.

FIG. 18 illustrates raw-image shaping 1800 using a general transformation function 1820 of pixel values 1810 of a raw image to produce pixel values 1850 of lower coefficient of variation. Pixel values 1810 of the raw image, denoted $p_1$, $p_2, \ldots$, are modified to corresponding values $q_1, q_2, \ldots$, according to a transformation function 1820 which is a monotone increasing function. For the illustrated segment of the raw image, the span 1830 of the raw pixels is indicated as $(p_{max}-p_{min})$ and the span 1840 of the transformed pixels is indicated as $(q_{max}-q_{min})$. The coefficient of variation of the transformed pixels is smaller than the coefficient of variation of the raw pixels.

Figure 19:
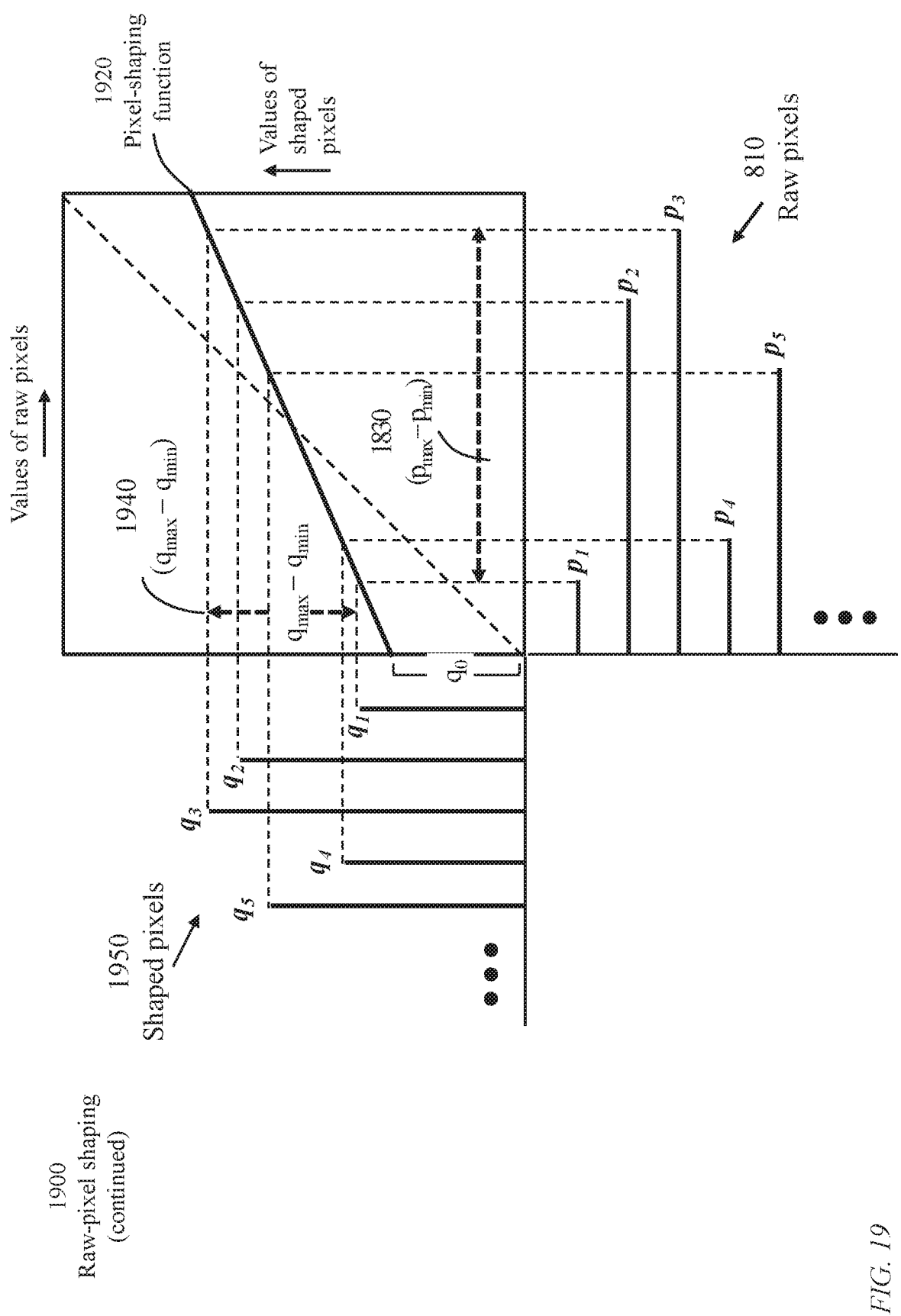
FIG. 19 illustrates linear transformation of pixel values of an image to produce pixel values of lower coefficient of variation.

FIG. 19 illustrates raw-image shaping 1900 using a linear transformation function 1920 of pixel values 1810 of a raw image to produce pixel values 1950 of lower coefficient of variation. The bias $q_0$ and slope of the linear transformation function 1920 are design options. The span 1940 of the transformed pixels is indicated as $(q_{max}-q_{max})$ which is determined from $(p_{max}-p_{min})$ according to the slope of function 1920. The bias $q_0$ determines the reduced coefficient of variation.

Figure 20:
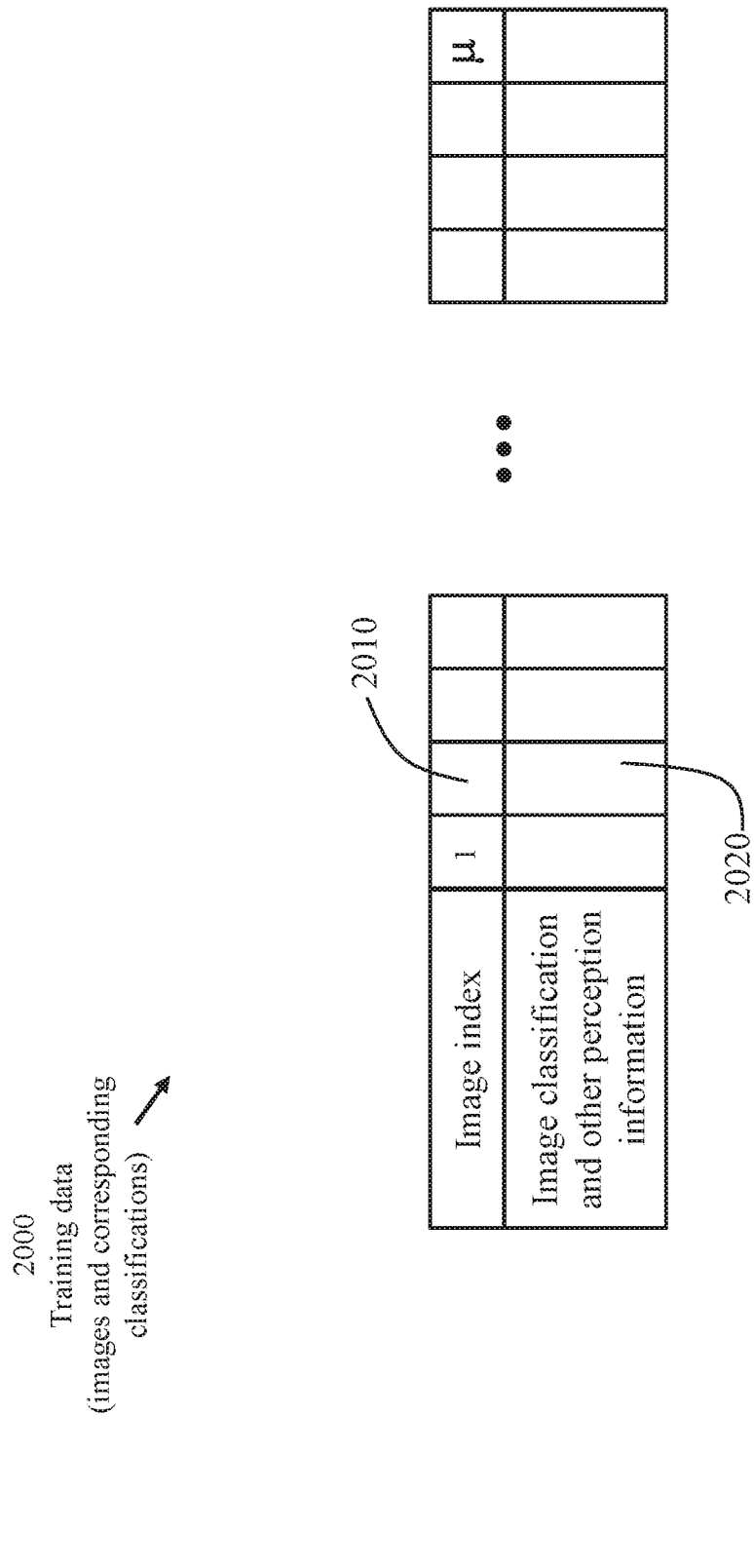
FIG. 20 illustrates data structures of a training data set and apparatus parameters.

FIG. 20 illustrates data structures of a training data set 2000. For each image index 2010, information 2020 relevant to the image classification and other perception information is provided.

Figure 21:
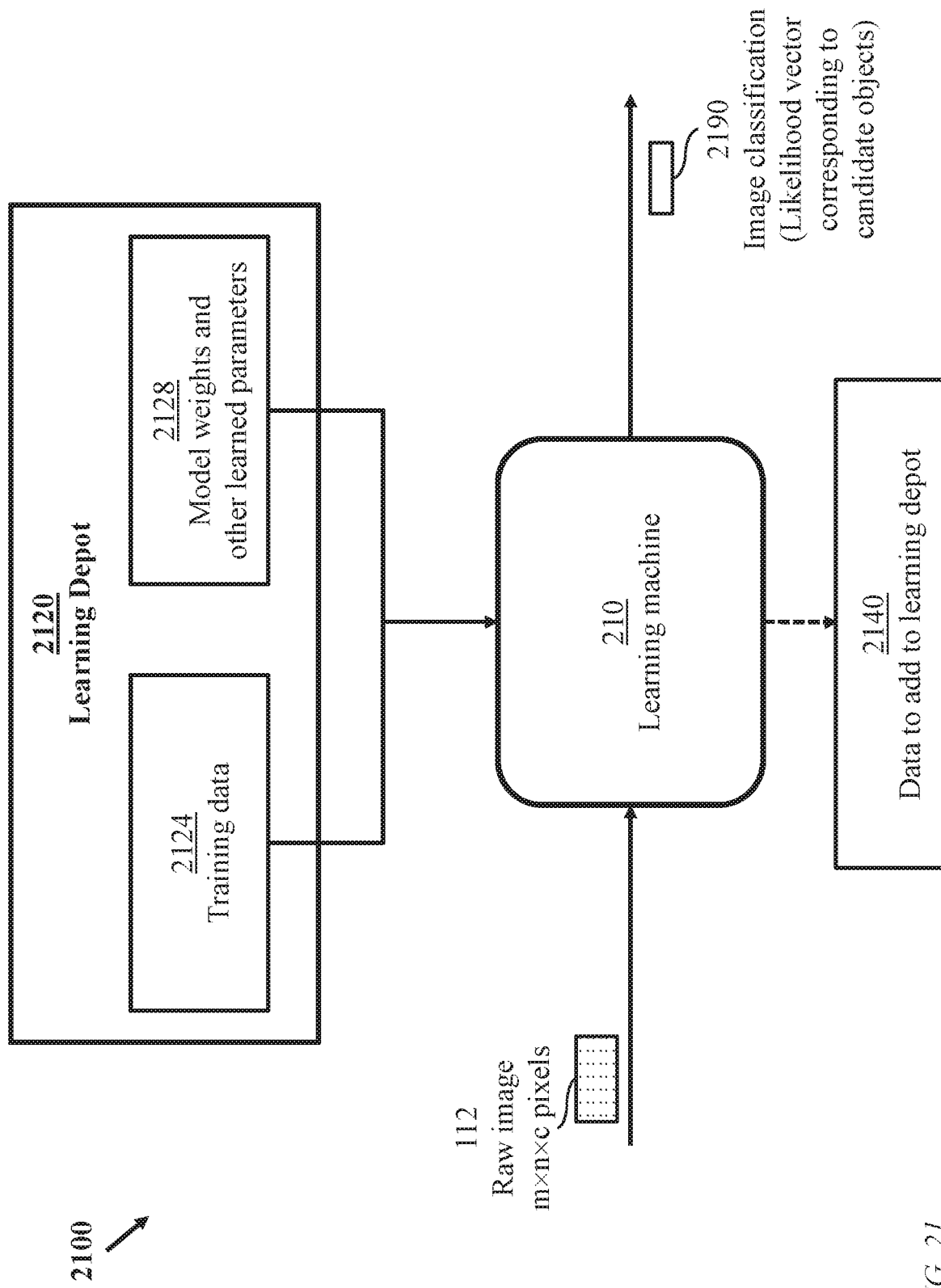
FIG. 21 is an overview of a system using the learning machine of FIG. 2 for the training phase and operation phase.

FIG. 21 is an overview 2100 of a system using the learning machine of FIG. 2. A Learning depot 2120 stores training data 2124 and learned data 2128 including parameters of the image representation network 220 and weights of the image analysis network 230. During operation to classify incoming images, selected data 2140 may be added to the learning depot 2120. The Image classification 2190 may be determined a label (class identifier) or a likelihood vector corresponding to candidate objects.

Thus, an improved method and system for machine learning have been provided. The method of machine learning is based on acquiring a plurality of raw images and employing at least one hardware processor to execute processes of determining a representation of a raw image of the plurality of raw images, initializing a plurality of representation parameters of the representation, defining a plurality of analysis parameters of an image analysis network configured to process the image representation, and jointly training the plurality of representation parameters and the plurality of analysis parameters to optimize a combined objective function. The combined objective function may be formulated as a nested bilevel objective function comprising an outer objective function relevant to the image analysis network and an inner objective function relevant to the representation.

The process of determining a representation of a raw image starts with transforming pixel-value of the raw image to produce a variance-stabilized transformed image. The transformed image is processed in a sequence of image representation stages, each stage comprising a soft camera projection module and an image projection module, resulting in a multi-channel representation. An inverse pixel-value transformation is applied to the multi-channel representation. The pixel-value transformation may be based on an Anscombe transformation in which case the inverse pixel-value transformation would be an unbiased inverse Anscombe transformation. The process of pixel-value transformation also generates an added channel.

The process of image projection comprises performing steps of multi-level spatial convolution, pooling, subsampling, and interpolation. The plurality of representation parameters comprises values of the number of levels, pooling, a stride of subsampling, and a step of interpolation.

The learned machine may be evaluated using a plurality of test images. The number of levels, pooling parameter, a stride of the subsampling, and a step of the interpolation may be revised according to a result of the evaluation. Selected test images may be added to the plurality of raw images then the processes of determining, initializing, defining, and jointly training would be repeated.

The learned machine may be cyclically operated in alternate modes. During a first mode the plurality of raw images are updated and the processes of determining, initializing, defining, and jointly training are executed. During a second mode, new images are analysed according to latest values of the plurality of representation parameters and the plurality of analysis parameters.

Systems and apparatus of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data sets described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A system for end-to-end differentiable joint image refinement and perception, comprising:
 a processor;
 a learning machine, having a memory having computer readable instructions stored thereon for execution by the processor, causing the processor to:
  determine a representation of a raw image of a plurality of raw images, comprising:
   transforming pixel-values of the raw image to produce a transformed image comprising transformed pixels of variance-stabilized values;
   successively performing processes of:
    soft camera projection; and
    image projection;
   and
   inverse transforming the transformed pixels;
  initialize a plurality of representation parameters of the representation;
  define a plurality of analysis parameters of an image analysis network processing the representation; and
  jointly train the plurality of representation parameters and the plurality of analysis parameters to optimize a combined objective function, thereby producing a learned machine.

2. The system of claim 1, further comprising an image acquisition module for acquiring the plurality of raw images.

3. The system of claim 1, wherein the computer readable instructions further cause the processor to:
 update the plurality of raw images and evaluate the learned machine using an updated plurality of raw images; and
 revise the plurality of representation parameters based on results of evaluation.

4. The system of claim 1, further comprising a learning depot comprising training data and learned data.

5. The system of claim 1, wherein the image refinement comprises at least one of the following:
 demosaicing;
 denoising;
 deblurring;
 tone mapping.

6. The system of claim 1, wherein the perception comprises image classification.

7. The system of claim 1, wherein the processor readable instructions further cause the processor to:
 implement an Anscombe transformation for the transforming pixel-values; and implement an unbiased inverse Anscombe transformation for the inverse transforming, thereby producing a learned machine.

8. The system of claim 7, wherein the processor readable instructions further cause the processor to generate an additional channel to the transformed image.

9. The system of claim 7, wherein the processor readable instructions causing the image projection comprise computer readable instructions to perform multi-level spatial convolution, pooling, subsampling, and interpolation.

10. The system of claim 9, wherein the plurality of representation parameters comprises a number of levels for the multi-level spatial convolution, a pooling parameter, a stride of the subsampling, and a step of the interpolation.

11. The system of claim 9, wherein the processor readable instructions further cause the processor to:
evaluate a performance using a plurality of test images; and
revise the multi-level spatial convolution, the pooling, the subsampling, and the interpolation according to a result of evaluating the performance.

12. A learning machine for joint image refinement and perception, comprising:
a memory having computer readable instructions stored thereon for execution by a processor, forming:
means for determining a representation of a raw image of a plurality of raw images, comprising:
means for transforming pixel-values of the raw image to produce a transformed image comprising transformed pixels of variance-stabilized values;
means for successively performing:
soft camera projection; and
image projection;
and
means for inverse transforming the transformed pixels;
means for initializing a plurality of representation parameters of the representation;
means for defining a plurality of analysis parameters of an image analysis network processing the representation; and
means for jointly training the plurality of representation parameters and the plurality of analysis parameters to optimize a combined objective function, thereby producing a learned machine.

13. The learning machine of claim 12, further comprising:
means for updating the plurality of raw images and evaluating a performance of the learned machine using an updated plurality of raw images; and
means for revising the plurality of representation parameters based on the evaluating.

14. The learning machine of claim 12, wherein the image refinement comprises at least one of the following:
demosaicing;
denoising;
deblurring;
tone mapping.

15. The learning machine of claim 12, wherein the perception comprises image classification.

16. The learning machine of claim 12, wherein the means for transforming pixel-values further comprise:
means for performing an Anscombe transformation for the transforming pixel-values; and
means for performing an unbiased inverse Anscombe transformation for the inverse transforming.

17. The learning machine of claim 16, further comprising means for generating an additional channel to the transformed image.

18. The learning machine of claim 16, wherein the image projection comprises multi-level spatial convolution, pooling, subsampling, and interpolation.

19. The learning machine of claim 18, wherein the plurality of representation parameters comprises a number of levels for the multi-level spatial convolution, a pooling parameter, a stride of the subsampling, and a step of the interpolation.

20. The learning machine of claim 18, further comprising:
means for evaluating a performance of the learning machine using a plurality of test images; and
means for revising the multi-level spatial convolution, the pooling, the subsampling, and the interpolation based on the evaluating.

21. A method of machine learning, comprising:
employing a hardware processor for joint image refinement and perception, comprising:
determining a representation of a raw image of a plurality of raw images, comprising:
transforming pixel-values of the raw image to produce a transformed image comprising transformed pixels of variance-stabilized values;
successively performing:
soft camera projection; and
image projection;
and
inverse transforming the transformed pixels;
initializing a plurality of representation parameters of the representation;
defining a plurality of analysis parameters of an image analysis network processing the representation; and
jointly training the plurality of representation parameters and the plurality of analysis parameters to optimize a combined objective function;
thereby producing a learned machine.

* * * * *